United States Patent
Mitani et al.

(10) Patent No.: US 6,666,039 B2
(45) Date of Patent: Dec. 23, 2003

(54) AIRCRAFT AIR CONDITIONER

(75) Inventors: Hisashi Mitani, Suita (JP); Hidefumi Saito, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/186,750

(22) Filed: Jul. 2, 2002

(65) Prior Publication Data

US 2003/0005719 A1 Jan. 9, 2003

Related U.S. Application Data

(63) Continuation-in-part of application No. 10/061,279, filed on Feb. 4, 2002, now abandoned.

(30) Foreign Application Priority Data

| Jul. 5, 2001 | (JP) | 2001-205072 |
| Sep. 17, 2001 | (JP) | 2001-281883 |
| Jun. 11, 2002 | (JP) | 2002-170438 |

(51) Int. Cl.⁷ .................................................. F25B 9/00
(52) U.S. Cl. .................... 62/172; 62/78; 62/86; 62/401
(58) Field of Search ................ 62/78, 86, 87, 62/401, 172

(56) References Cited

U.S. PATENT DOCUMENTS

| 3,349,570 A | 10/1967 | Potts | |
| 4,337,071 A | * 6/1982 | Yang | 62/78 |
| 4,896,514 A | 1/1990 | Sugiyama et al. | |
| 5,323,624 A | 6/1994 | Schwalm | |
| 5,327,739 A | * 7/1994 | Ingersoll et al. | 62/78 |
| 5,327,744 A | 7/1994 | Frawley et al. | |
| 5,425,240 A | 6/1995 | Jain et al. | |
| 5,435,141 A | 7/1995 | Rose et al. | |
| 6,401,473 B1 | * 6/2002 | Ng et al. | 62/86 |

* cited by examiner

Primary Examiner—William C. Doerrler
(74) Attorney, Agent, or Firm—Westerman, Hattori, Daniels & Adrian, LLP

(57) ABSTRACT

In an air conditioner, air extracted from engine is fed through a main air flow path into cabin after being cooled by a cooling device. This extracted air is fed into the cabin through an auxiliary air flow path. The air within the cabin flows out through an outflow air flow path. A plurality of adsorption sections are constituted by an adsorption agent that adsorbs molecules contained in the air and releases adsorbed molecules by being raised in temperature to more than the temperature thereof on adsorption. By control of an air flow changeover mechanism by a controller, each of the adsorption sections is changed over between a condition connected with the auxiliary air flow path and a condition connected with the outflow air flow path.

15 Claims, 16 Drawing Sheets

Prior Art

AIRCRAFT AIR CONDITIONER

CROSS REFERENCE TO RELATED APPLICATION

This is a continuation-in-part application of patent application Ser. No. 10/061,279 filed on Feb. 4, 2002 now abandoned.

FIELD OF THE INVENTION

The present invention relates to an air conditioner used to control the internal temperature, humidity, oxygen partial pressure and pressure of aircraft, including fixed-wing aircraft and rotating-wing aircraft.

DESCRIPTION OF THE RELATED ART

As air conditioners in aircraft, conventionally air cycle cooling devices were chiefly employed in which temperature-adjusted and pressure-adjusted cooled air is obtained by using a radial compressor to perform adiabatic compression of extracted air compressed in a compression section of an engine, after subjecting the air to heat exchanging with external air for cooling, and by using an expansion turbine to perform adiabatic expansion of the air after again subjecting the adiabatic compressed air to heat exchanging with external air for cooling.

Specifically, in the conventional aircraft air conditioner shown in FIG. 16, air extracted from engine 101 is cooled by a heat exchanger called a pre-cooler 102 before being practically adiabatically compressed by a radial compressor 103; the air which has thereby been raised in temperature is cooled by a heat exchanger called a main cooler 104 and practically adiabatically expanded by expansion turbine 105. Cooled air is thereby obtained. In this pre-cooler 102 and main cooler 104, cooling is performed by external air passing through ram air flow path 109. The expansion work of this expansion turbine 105 is utilized as compressive power by being transmitted to compressor 103 through shaft 106. It should be noted that when the aircraft is on the ground or in low-level flight, the external air temperature is high and the moisture content of the air is high, so when expansion takes place in the expansion turbine 105, moisture in the air condenses and a mist of water droplets is formed. A water separator 107 is therefore arranged downstream of expansion turbine 105 to capture the moisture. Cabin cooling is performed by supplying the cooled air that has passed through this water separator 107 to the interior of cabin 108, including the cockpit space of the aircraft. If the engine is stopped while the aircraft is on the ground, it is arranged to be possible to supply extracted air from a high-pressure air supply unit such as an auxiliary engine called an auxiliary power unit, instead of engine 101, to the air conditioner.

In order to perform cabin heating at high altitude etc., a bypass air flow path 111 is provided to feed air extracted from engine 101 into cabin 108; this bypass air flow path 111 is opened/closed by means of a hot-air modulating valve 112. Some of the extracted air is fed to a mixing duct 113 arranged downstream of water separator 107 instead of being cooled by the air cycle cooling device constituted by compressor 103 and expansion turbine 105, by opening this hot-air modulating valve 112. In this mixing duct 113, extracted air cooled by the air cycle cooling device and extracted air that has not been cooled are mixed. Air of a suitable temperature is thus obtained by adjusting the degree of opening of hot-air modulating valve 112. Cabin heating can be performed by supplying this air of suitable temperature into cabin 108. When cruising at high altitude, the ram air flow path 109 is throttled, so the air extracted from engine 101 is kept in a moderately high temperature since it is not excessively cooled in pre-cooler 102 or main cooler 104. The air within this cabin 108 is discharged directly into the space 114 outside the fuselage through pressure reducing valve 110 in an amount corresponding to the difference obtained by subtracting the amount of leakage from the fuselage from the amount supplied by the air conditioner.

In conventional air conditioners, in order to control the temperature and pressure and to prevent the reduction of oxygen concentration such as to achieve comfort of the people in the cabin, it is necessary to increase the rate of air extraction from engine 101. It was therefore difficult to combine lowering of engine load with cabin comfort.

An object of the present invention is to provide an aircraft air conditioner capable of solving the above problems.

SUMMARY OF THE INVENTION

An aircraft air conditioner according to the present invention wherein air extracted from an engine that is fed through a main air flow path into an aircraft cabin is cooled by a cooling device comprises: an outflow air flow path for outflow of air in the cabin; an auxiliary air flow path for feeding air into the cabin; a plurality of adsorption sections respectively constituted of adsorption agent that adsorb molecules contained in the air and that release the adsorbed molecules by being raised in temperature to more than the temperature thereof on adsorption; an air flow path changeover mechanism; and a controller that controls the air flow path changeover mechanism, wherein each of the adsorption sections is made capable of being changed over between a condition in which it is connected to an auxiliary air flow path in which air of higher temperature than the air within the cabin flows and a condition in which it is connected to the outflow air flow path by means of the air flow path changeover mechanism; and each of the adsorption sections is changed over between the condition connected to the auxiliary air flow path and the condition connected to the outflow air flow path by controlling the air flow path changeover mechanism by the controller.

Preferably, the adsorption sections are constituted by at least either an adsorption agent capable of adsorbing water molecules or an adsorption agent capable of adsorbing oxygen molecules.

According to the present invention, when the air flowing out from the cabin into the outflow air flow path passes through the adsorption sections, the molecules contained in the air are adsorbed by the adsorption agent in the adsorption sections. When the air flowing in the auxiliary air flow path passes through the adsorption sections, since this air is of higher temperature than the air flowing out from the cabin, the molecules adsorbed by the adsorption agent in the adsorption sections are released into the air flowing in the auxiliary air flow path. Since the adsorption sections are changed over between a condition connected to the auxiliary air flow path and a condition connected to the outflow air flow path, the molecules contained in the air flowing out from the cabin can be returned into the cabin. Also, the adsorption agent in the adsorption sections is regenerated so that molecules in the air can again be adsorbed. If the adsorption agent adsorbs and releases water molecules, this adsorption and release of water molecules can contribute to maintaining humidity within the cabin. If the adsorption agent adsorbs and releases oxygen molecules, this adsorption and release of oxygen molecules can contribute to maintaining the oxygen concentration within the cabin. Furthermore, the present invention can easily be applied to small aircraft, because regeneration of the air in the cabin can be achieved by an uncomplicated construction of adding adsorption sections and a mechanism to change over the flow of air to these adsorption sections.

Preferably, when at least one adsorption section is connected to the auxiliary air flow path, at least one other adsorption section is connected to the outflow air flow path. In this way, adsorption and release of molecules into the air by the adsorption sections can be performed efficiently.

Preferably, there is provided a discharge mechanism capable of discharging at least some of the air flowing through the outflow air flow path to the space outside the fuselage in accordance with conditions during flight or the conditions of the air within the fuselage, after passing through the adsorption section. In this way, molecules contained in the air are absorbed before the air is discharged to the space outside the fuselage to maintain the pressure within the cabin at a suitable level, so molecules such as water or oxygen contained in this air can be effectively re-used. For example, it becomes even easier to maintain water vapor or oxygen concentration within the cabin at the target values, making it possible to greatly increase passengers' sense of comfort. In particular, this is effective in preventing a lowering of humidity when there is little generation of water vapor within the cabin due to the number of passengers being small.

Furthermore, preferably a discharge changeover mechanism is provided whereby at least some of the air flowing through the outflow air flow path is changed over between a condition in which it is discharged into the space outside the fuselage via the discharge mechanism after passing through the adsorption section and a condition in which it is discharged to the space outside the fuselage via the discharge mechanism without passing through the adsorption section. In this way, when the need to re-use molecules contained in the fuselage air is high, the fuselage air is discharged to the space outside the fuselage after passing through the adsorption section and when the need to re-use this is low, the fuselage air is discharged into the space outside the fuselage without passing through the adsorption section. For example, when flying at high altitude, the fuselage air is discharged to the space outside the fuselage after passing through the adsorption section, but when on the ground at high temperature and high humidity, the fuselage air is discharged to the space outside the fuselage without passing through the adsorption section. In this way, cabin humidity can be maintained in a comfortable range when on the ground etc., since not only moisture adsorbed by the adsorption agent from the recirculation air flows is discharged but moisture can be contained in the air discharged to the space outside the fuselage.

Preferably the adsorption sections are constituted of an adsorption agent capable of adsorbing at least oxygen molecules, and air of oxygen concentration lowered in the adsorption sections is fed to a fuel peripheral region. In this way, occurrence of fuel fires can be prevented by nitrogen-enriched gas of lowered oxygen concentration.

Preferably it is arranged that the flow rate of air flowing through the auxiliary air flow path is adjustable. In this way, the temperature within the cabin can be suitably maintained by adjusting the ratio of the flow rate of air fed into the cabin after cooling by the cooling device to the flow rate of air fed into the cabin without cooling.

Preferably, a selectively permeable membrane is provided at a position through which air flowing in an air flow path of the air conditioner passes, so that it separates the air into nitrogen-enriched gas and oxygen-concentrated gas, wherein the nitrogen enriched gas can be fed into a fuel peripheral region and the oxygen-concentrated air can be fed into the cabin. In this way, occurrence of fuel fires can be prevented and the oxygen concentration within the cabin can be maintained.

Preferably the adsorption agent is made capable of adsorbing at least water molecules, and the selectively permeable membrane is provided in an air flow path in which air flowing out from the cabin through the outflow air flow path flows after passing through the adsorption sections. In this way, the air flowing out from the cabin can again be fed into the cabin as oxygen-concentrated air, and the necessary air flow rate for controlling the pressure within the cabin can be ensured without increasing the rate of extraction of air from the engine. Furthermore, since moisture is removed from the air fed to the selectively permeable membrane in the adsorption sections, the moisture released to outside the fuselage after passing through the selectively permeable membranes is reduced and the humidity in the cabin can therefore be maintained. Also, moisture can be prevented from becoming mixed with the fuel.

Preferably the adsorption agent is made capable of adsorbing at least water molecules, and arrangement is made such that the air flowing out from the cabin through the outflow air flow path can be fed into the cabin after passing through the adsorption sections and being adjusted in temperature suitable for the cabin. In this way, air flowing out from the cabin can be fed back into the cabin at a suitable temperature, and the air flow rate necessary for controlling the pressure and temperature within the cabin can be ensured without increasing the rate of air extraction from the engine. Furthermore, the humidity within the cabin can be maintained by returning moisture adsorbed in the adsorption sections into the cabin.

Preferably the air flow path is made capable of being changed over between a condition in which the air flowing through the auxiliary air flow path is discharged outside the fuselage and a condition in which it is fed into the cabin, after passing through the adsorption sections, and/or the air flow path is made capable of being changed over between a condition in which the air flowing out from the cabin through the outflow air flow path is fed into the cabin and a condition in which it is fed into the cooling device, after passing through the adsorption sections. In this way, when the temperature, humidity, oxygen concentration or pressure of the external air and/or the flow rate of the extracted air from the engine change in accordance with the condition of flight of the aircraft, the temperature, humidity, oxygen concentration and pressure within the cabin can be optimally maintained. Also, if the humidity within the fuselage is excessive, air containing moisture released from the adsorption agent can be discharged into the space outside the fuselage. In addition, when air flowing out from the cabin is again fed into the cooling device, dew formation of the cooling device can be prevented.

Preferably the auxiliary air flow path is constituted by a bypass air flow path for feeding air extracted from the engine to the cabin without passing through the cooling device. In this way, the adsorption agent can be regenerated by releasing molecules from the adsorption agent, because high-temperature air extracted from the engine passes through the adsorption sections.

Preferably the auxiliary air flow path is constituted by a circulating air flow path for feeding air flowing out from the cabin again into the cabin, and means for heating air flowing through the circulating air flow path before passing through the adsorption agent is provided. In this way, increase in the engine load can be prevented without needing to consume air extracted from the engine for regenerating the adsorption agent. The air flowing in the circulating air flow path can be heated by the heat emitted from electrical equipment mounted in the aircraft.

Preferably the auxiliary air flow path is constituted by a circulating air flow path for feeding air flowing out from the cabin again into the cabin, the adsorption agent is made capable of adsorbing at least water molecules, compression means is provided for compressing air flowing out from the cabin through the outflow air flow path downstream of the adsorption section; a heat exchanger is provided downstream of the compression means, for performing heat exchange between the compressed air and the air flowing through the circulating air flow path; and the air flowing through the circulating air flow path is heated in the heat exchanger prior to passage through the adsorption agent. In this way, the temperature of the air flowing in the circulating air flow path can be raised by the heat generated by compressing the outflowing air, so there is no need to provide a further heat source and energy consumption can thereby be reduced. By cooling the compressed air by means of air flowing out from the cabin through the circulating air flow path, the air temperature after compression can be appreciably lowered. Therefore, even when recooling is necessary, the cooling device for this purpose can be made smaller.

Preferably, a selectively permeable membrane is provided for separating the outflowing air cooled in the heat exchanger after compression into nitrogen-enriched gas and oxygen-concentrated air; and arrangement is made such that the nitrogen-enriched gas can be fed into a fuel peripheral region of the aircraft and the oxygen-concentrated air can be fed into the cabin. In this way, the air flow that passes through the selectively permeable membrane can be ensured without consuming air extracted from the engine. Furthermore, as a result of removing the moisture prior to arrival of the air at the selectively permeable membrane, there is no possibility of moisture flowing out through the selectively permeable membrane, and so discharge of moisture from the cabin and admixture of moisture with the fuel can be prevented. Also, nitrogen-enriched gas can be obtained efficiently by compressing the air fed to the selectively permeable membrane.

If a large quantity of nitrogen-enriched gas is required, the air needed for regenerating the adsorption agent is increased since the amount of air whose moisture has been adsorbed by the adsorption agent is increased. In this case, since the compressed air is also increased prior to being fed to the selectively permeable membrane, the amount of heat used to heat the air flowing out from the cabin through the circulating air flow path can be increased. The high temperature air needed to regenerate the adsorption agent is thereby ensured by the heating of the air. That is, a system with a good balance of air flow rates can be obtained.

According to the present invention, an air conditioner can be provided wherein the temperature, humidity, oxygen concentration and pressure within the cabin can be properly maintained without increasing the engine load, with improving comfort, and which can contribute to preventing occurrence of fuel fires and whereby dew formation of the cooling device can be prevented and furthermore which is suited both to large aircraft and small aircraft.

DESCRIPTION OF THE PREFERRED EMBODIMENTS

Figure 1:
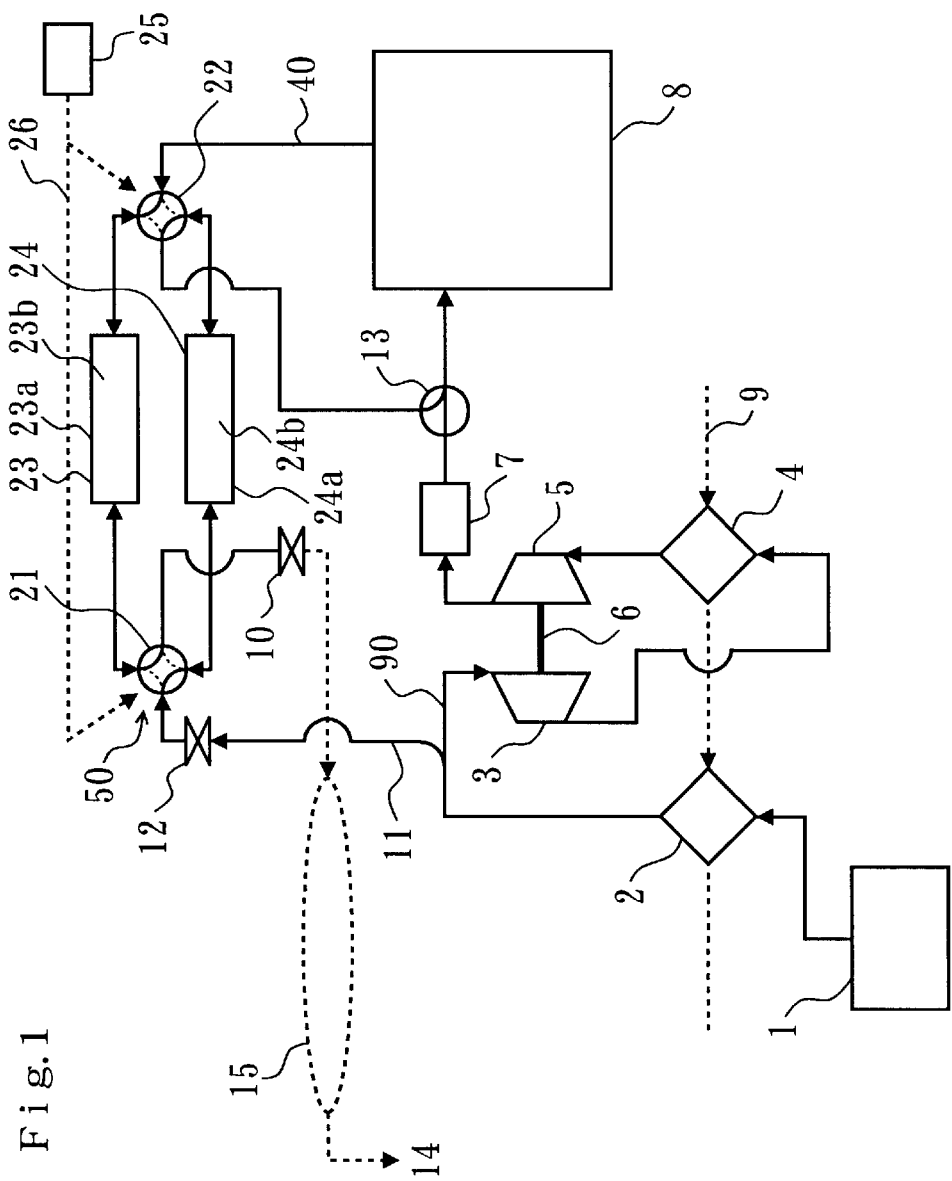
FIG. 1 is a layout diagram of an aircraft air conditioner according to a first embodiment of the present invention.

In the aircraft air conditioner of the first embodiment shown in FIG. 1, extracted air from an engine 1 is fed into a cabin 8 including the cockpit space of an aircraft through a main air flow path 90. Specifically, the extracted air from this engine 1 is cooled by a heat exchanger called a pre-cooler 2 before being practically adiabatically compressed by a radial compressor 3; the air which has thereby been raised in temperature is cooled by a heat exchanger called main cooler 4 and is practically adiabatically expanded in expansion turbine 5. Cooled air is thereby obtained. In this pre-cooler 2 and main cooler 4, cooling by external air passing through ram air flow path 9 is performed. The expansion work of this expansion turbine 5 is utilized as compressive power by being transmitted to compressor 3 through shaft 6. If the aircraft is on the ground or in low-level flight, the external air temperature is high and the moisture content of the air is high, moisture in the air condenses with forming a mist of water droplets when expansion takes place in the expansion turbine 5. A water separator 7 is therefore arranged downstream of the expansion turbine 5 to capture the moisture. Cabin cooling is performed by supplying the cooled air that has passed through this water separator 7 to the interior of the cabin 8 including the cockpit space of the aircraft. When the engine is stopped while the aircraft is on the ground, it is arranged to be possible to supply extracted air from a high-pressure air supply unit, instead of the engine 1, to the air conditioner.

In order to perform cabin heating at high altitude etc., a bypass air flow path 11 is provided as an auxiliary air flow path to feed extracted air from the engine 1 into the cabin 8 without passing through the air cycle cooling device constituted by the aforementioned compressor 3 and expansion turbine 5. This bypass air flow path 11 is opened/closed by means of a hot air modulating valve 12. The flow rate of the air flowing in the bypass air flow path 11 can be adjusted by making the degree of opening of this hot-air modulating valve 12 adjustable by means of a signal from a controller 25. Some of the extracted air is fed to a mixing duct 13 arranged downstream of water separator 7 without being cooled by the air cycle cooling device constituted by the compressor 3 and expansion turbine 5, by opening this hot-air modulating valve 12. In this mixing duct 13, extracted air cooled by the air cycle cooling device and extracted air that has not been cooled are mixed. Air of a suitable temperature is thus obtained by adjusting the degree of opening of hot-air modulating valve 12. Cabin heating can be performed by supplying this air of suitable temperature into cabin 8. When cruising at high altitude, the ram air flow path 9 is throttled, and thus the air extracted from engine 1 is not excessively cooled in pre-cooler 2 or main cooler 4 and is maintained in a moderately high temperature. The air within the cabin 8 flows out through an outflow air flow path 40 in an amount corresponding to the difference, which is obtained by subtracting the amount discharged from a valve (not shown) for adjusting the internal pressure of the aircraft and the amount of leakage from the fuselage from the amount supplied by the air conditioner.

A first adsorption section 23 and a second adsorption section 24 are connected by means of an air flow path changeover mechanism 50 with the bypass air flow path 11 and outflow air flow path 40. The adsorption sections 23 and 24 comprise adsorption agents 23b, 24b packed in containers 23a, 24a. The adsorption agent 23b, 24b adsorbs molecules contained in the air and releases the adsorbed molecules by being raised in temperature to more than the temperature thereof on adsorption. For example, the adsorption agent 23b, 24b can be constituted of a water molecule adsorbing substance such as silica gel or an oxygen molecule adsorbing substance such as zeolite.

By means of the air flow path changeover mechanism 50, adsorption sections 23, 24 are made to be capable of being changed over between a condition connected to the bypass air flow path 11 and a condition connected to the outflow air flow path 40. In this embodiment, the bypass air flow path 11 is alternately connected with the first adsorption section 23 and the second adsorption section 24, so that the extracted air flowing in the bypass air flow path 11 passes alternately through the first adsorption section 23 and the second adsorption section 24. Also, the outflow air flow path 40 is alternately connected with the first adsorption section 23 and the second adsorption section 24 so that the air flowing in the outflow air flow path 40 is alternately passed through the first adsorption section 23 and the second adsorption section 24. The air flow path changeover mechanism 50 of this embodiment comprises a first changeover valve 21 and second changeover valve 22.

The first changeover valve 21 is changed over between a first condition shown by broken lines in the figure and a second condition shown by solid lines in the figure. In the first condition, air fed to the bypass air flow path 11 from the engine 1 is fed to the first adsorption section 23 and air flowing out from the second adsorption section 24 is fed to a space 14 outside the fuselage. In this second condition, air fed to the bypass air flow path 11 from the engine 1 is fed to the second adsorption section 24 and air flowing out from the first adsorption section 23 is fed to the space 14 outside the fuselage.

The second changeover valve 22 is changed over between a first condition indicated by broken lines in the figure and a second condition indicated by solid lines in the figure. In the first condition, air flowing out from the first adsorption section 23 is fed to the cabin 8 through the mixing duct 13 and air fed into the outflow air flow path 40 from the cabin 8 is fed to the second adsorption section 24. In the second condition, air flowing out from the second adsorption section 24 is fed into the cabin 8 through the mixing duct 13 and air fed to the outflow air flow path 40 from the cabin 8 is fed to the first adsorption section 23.

The air flow path changeover mechanism 50 is controlled by a controller 25 mounted on the, aircraft. By means of this control, each of the adsorption sections 23 and 24 is changed over between a condition connected to the bypass air flow path 11 and a condition connected to the outflow air flow path 40. That is, the two changeover valves 21 and 22 are changed over between the first condition and second condition by means of changeover signals sent at set time intervals set by means of an incorporated timer or the like in the controller 25. When the first changeover valve 21 is in the first condition, the second changeover valve 22 is in the first condition, and when the first changeover valve 21 is in the second condition, the second changeover valve 22 is in the second condition. Specifically, the air flow path changeover mechanism 50 is controlled such that, when the extracted air flowing in the bypass air flow path 11 passes through one of the two adsorption sections 23, 24, the air flowing in the outflow air flow path 40 passes through the other of the two adsorption sections 23, 24, and when the extracted air flowing in the bypass air flow path 11 passes through the other of the two adsorption sections 23, 24, the air flowing in the outflow air flow path 40 passes through the aforementioned one of the two adsorption sections 23, 24.

In this way, after being fed to one or other of the two adsorption sections 23, 24 through the first changeover valve 21, the extracted air that is fed to the bypass air flow path 11 by opening of the hot-air modulating valve 12 is supplied into the cabin 8 through the mixing duct 13 from the second changeover valve 22. In contrast, after being fed to one or other of the two adsorption sections 23, 24 from the second changeover valve 22, the air flowing out to outflow air flow path 40 from the cabin 8 is finally discharged into space 14 outside the fuselage after becoming of practically the same pressure as the space 14 by passing through a pressure reducing valve 10.

The temperature of the extracted air fed into the bypass air flow path 11 through the pre-cooler 2 from the engine 1 is 100° C. to 140° C., and the temperature of the air fed into outflow air flow path 40 from the cabin 8 is 20° C. to 30° C. In this way, the adsorption agent 23b, 24b adsorbs molecules contained in the air flowing out from the cabin 8, when its temperature is lowered by the air flowing out from the cabin 8 and passing through therein. The adsorption agent 23b, 24b releases the molecules, which are adsorbed from the air flowing out from the cabin 8, into the extracted air and is thus regenerated when its temperature is heightened by the extracted air flowing out from the engine 1 and passing through therein. For example, if the adsorption agent 23b, 24b is silica gel, 1.0 kg of silica gel can adsorb 0.25 kg or more of water molecules at 20° C., but 1.0 kg of silica gel can only adsorb 0.02 kg or less of water molecules at 100° C. In this way, water molecules in the air flowing out from the cabin 8 are adsorbed by the adsorption agent 23b, 24b and returned to the cabin 8 by being released into the air extracted from the engine 1, thereby improving the comfort of the cabin 8. In addition, the adsorption agent 23b, 24b is regenerated so that it can be used again. If zeolite, which functions as an oxygen molecule adsorbing substance, is employed for the adsorption agent 23b, 24b, the oxygen molecules in the air flowing out from the cabin 8 are adsorbed by the adsorption agent 23b, 24b and returned to the cabin 8 by being released into the air extracted from the engine 1, thereby improving comfort of the cabin 8. In addition, adsorption agent 23b, 24b is regenerated so that it can be re-used. Also, comfort of the cabin 8 can be even further improved by constituting the adsorption sections 23, 24 both of adsorption agent that can adsorb water molecules and adsorption agent that can adsorb oxygen molecules, thereby enabling both moisture and oxygen to be adsorbed. In this case, preferably silica gel and zeolite are arranged in alternate layer fashion.

Also, when an oxygen molecule adsorbing substance is employed as the adsorbing agent 23b, 24b, the oxygen concentration of the air flowing out through the adsorption sections 23, 24 after flowing out from the cabin 8 is lowered. Consequently, fuel fires can be prevented by feeding this air of lowered oxygen concentration to fuel peripheral regions 15 such as the interior of a fuel tank or the region of fuel piping, as indicated by broken lines in the figure.

With the above embodiment, molecules constituting active constituents contained in the air flowing out from the cabin 8 can be returned into the cabin 8 by air extracted from the engine 1. Also, the adsorption agent 23b, 24b can be regenerated so as to be capable of adsorbing molecules in the air. The adsorption and release of water molecules by the adsorption agent 23b, 24b can contribute to maintaining humidity within the cabin 8. The adsorption and release of oxygen molecules by the adsorption agent 23b, 24b can contribute to maintaining the oxygen concentration within the cabin 8. Furthermore, since regeneration of the air in the cabin 8 can be achieved by a straightforward construction of adding the adsorption sections 23, 24 and air flow path changeover mechanism 50, the present invention can easily be applied to aircraft of small size. Since the flow rate of air flowing in the bypass air flow path 11 can be adjusted, the temperature within the cabin 8 can be suitably maintained by adjusting the ratio of the flow rate of air fed into the cabin 8 after cooling by the air cycle cooling device to the flow rate of air fed into the cabin 8 without cooling. Furthermore, adsorption and discharge of molecules in the air can be performed efficiently by the adsorption sections 23, 24, because one adsorption section is connected to the bypass air flow path 11 when the other adsorption section is connected to the outflow air flow path 40.

Figure 2:
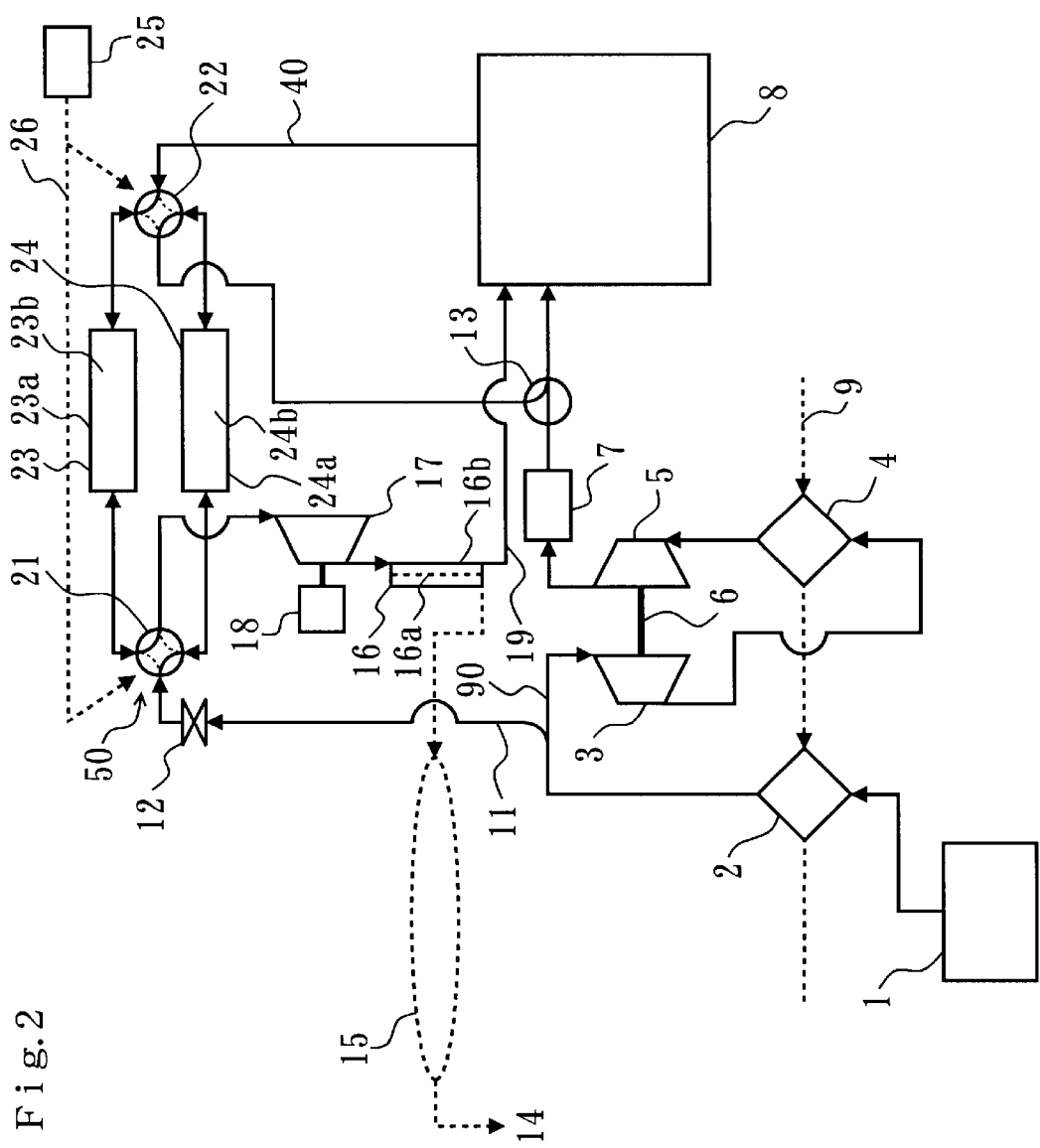
FIG. 2 is a layout diagram of an aircraft air conditioner according to a second embodiment of the present invention.

FIG. 2 illustrates an aircraft air conditioner according to a second embodiment of the present invention. Portions which are the same as in the case of the first embodiment are given the same reference symbols and the differences are described.

In this second embodiment, a compressor 17 driven by a motor 18 is arranged downstream of the air flow path changeover mechanism 50 in the outflow air flow path 40, and an air separating section 16 is arranged downstream of this compressor 17. This air separation section 16 is constructed by covering a selectively permeable membrane 16a comprised of a large number of hollow fibers with a housing 16b. Specifically, selectively permeable membranes 16a are provided in the air flow path in which air flowing out from the cabin 8 flows after passing through the adsorption sections 23, 24. Also, adsorption agent 23b, 24b of the adsorption sections 23, 24 are capable of adsorbing at least water molecules. In this embodiment, the permeability of the selectively permeable membrane 16a for nitrogen ($N_2$) and carbon dioxide ($CO_2$) in the air is higher than the permeability for oxygen ($O_2$). The air flowing out from the adsorption sections 23, 24 are increased in pressure to a pressure suitable for passage of nitrogen in the selectively permeable membrane 16a by the compressor 17. In this way, nitrogen-enriched gas (in this embodiment $N_2$=92% or more) passing through the selectively permeable membrane 16a is supplied to fuel peripheral regions 15, and the remain of the gas that is supplied to the regions 15 more than need is discharged to the space 14 outside the fuselage through a discharge path. The partial pressure of oxygen of the air that has not passed through this selectively permeable membrane 16a is increased. This oxygen-concentrated air of large oxygen partial pressure is again fed to the cabin 8 by a regenerated air flow path 19, which links the air separating section 16 and cabin 8. Otherwise, this embodiment is the same as the first embodiment.

In the second embodiment described above, occurrence of fuel fires can be prevented by means of the nitrogen-enriched gas separated by the selectively permeable membrane 16a, and the oxygen concentration in the cabin 8 can be set on the high side by utilizing the oxygen-concentrated air. Consequently, even if the internal air pressure of the cabin is set on the low side, this arrangement contributes to ensuring a partial pressure of oxygen at about the same level as on the ground and to maintaining the partial pressure of oxygen of a level at which passengers feel no difficulty in breathing. Also, the adsorption agent 23b, 24b is made capable of adsorbing at least water molecules, and the selectively permeable membrane 16a is provided in the air flow path in which air flowing out from the cabin 8 flows after passing through the adsorption sections 23, 24. In this way, the air flowing out from the cabin 8 can again be fed into the cabin 8 as oxygen-concentrated air. Consequently, the amount of air needed to control the pressure within the cabin 8 can be ensured without increasing the rate of air extraction from the engine 1. Furthermore, since the moisture in the cabin 8 is removed from the air fed into the selectively permeable membrane 16a, the moisture that is released to outside the fuselage after passing through the selectively permeable membrane 16a is reduced, enabling the humidity of the cabin 8 to be maintained. Also, nitrogen-enriched gas can be obtained with good efficiency by compressing the air that is fed to the selectively permeable membrane 16a.

Figure 3:
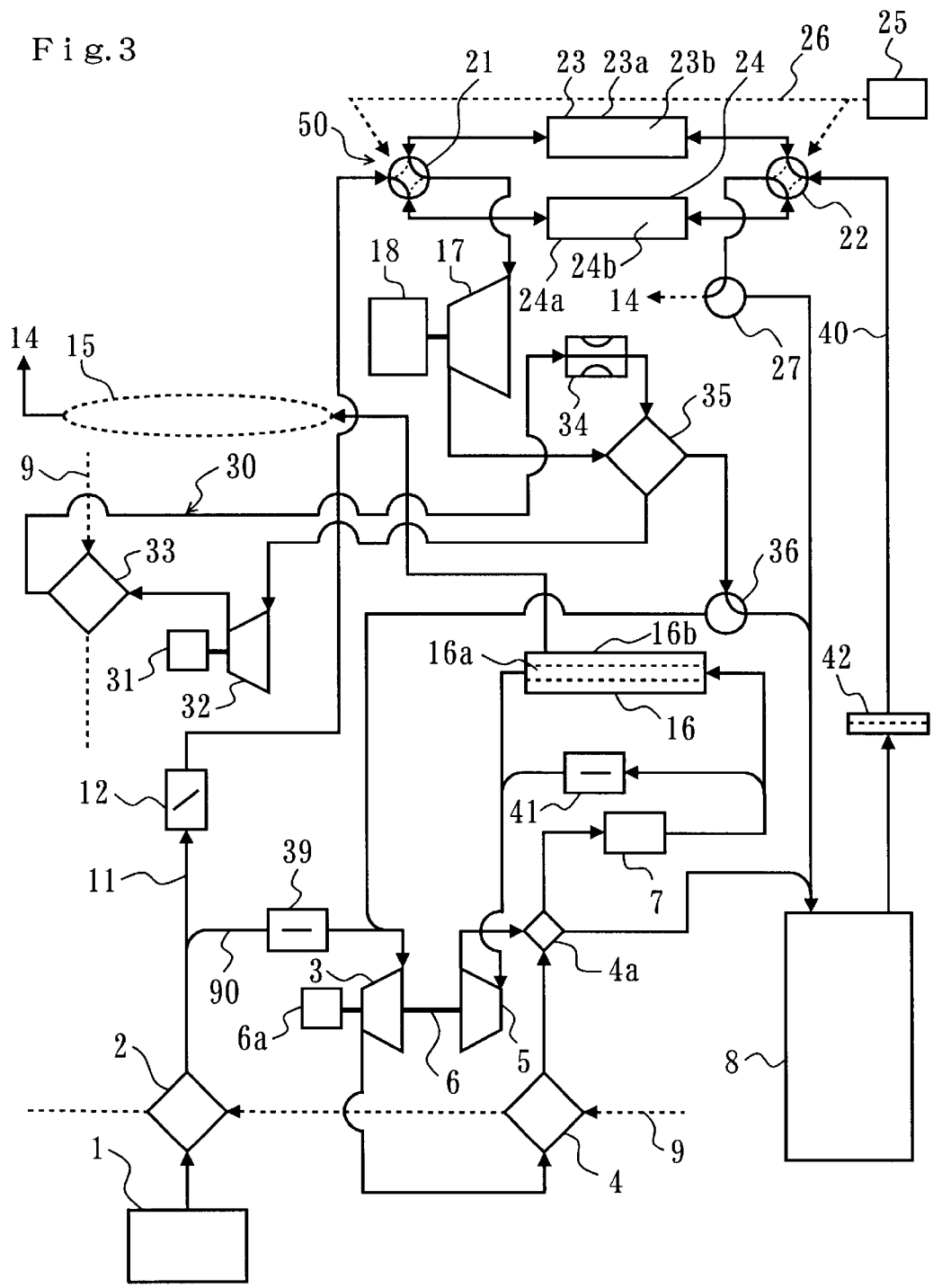
FIG. 3 is a layout diagram of an aircraft air conditioner according to a third embodiment of the present invention when the aircraft is on the ground.
Figure 4:
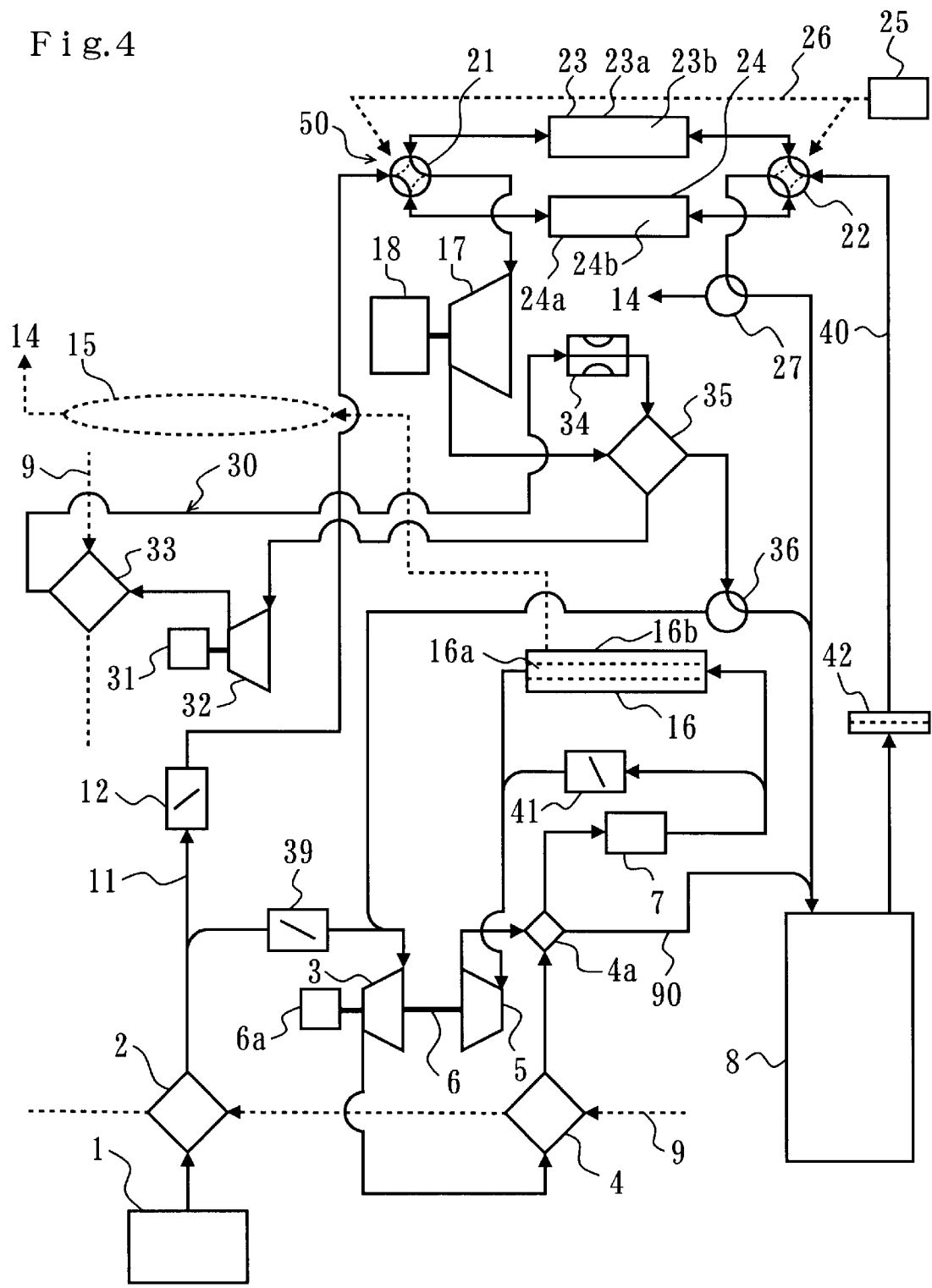
FIG. 4 is a layout diagram of the aircraft air conditioner according to the third embodiment of the present invention when the aircraft is climbing.
Figure 5:
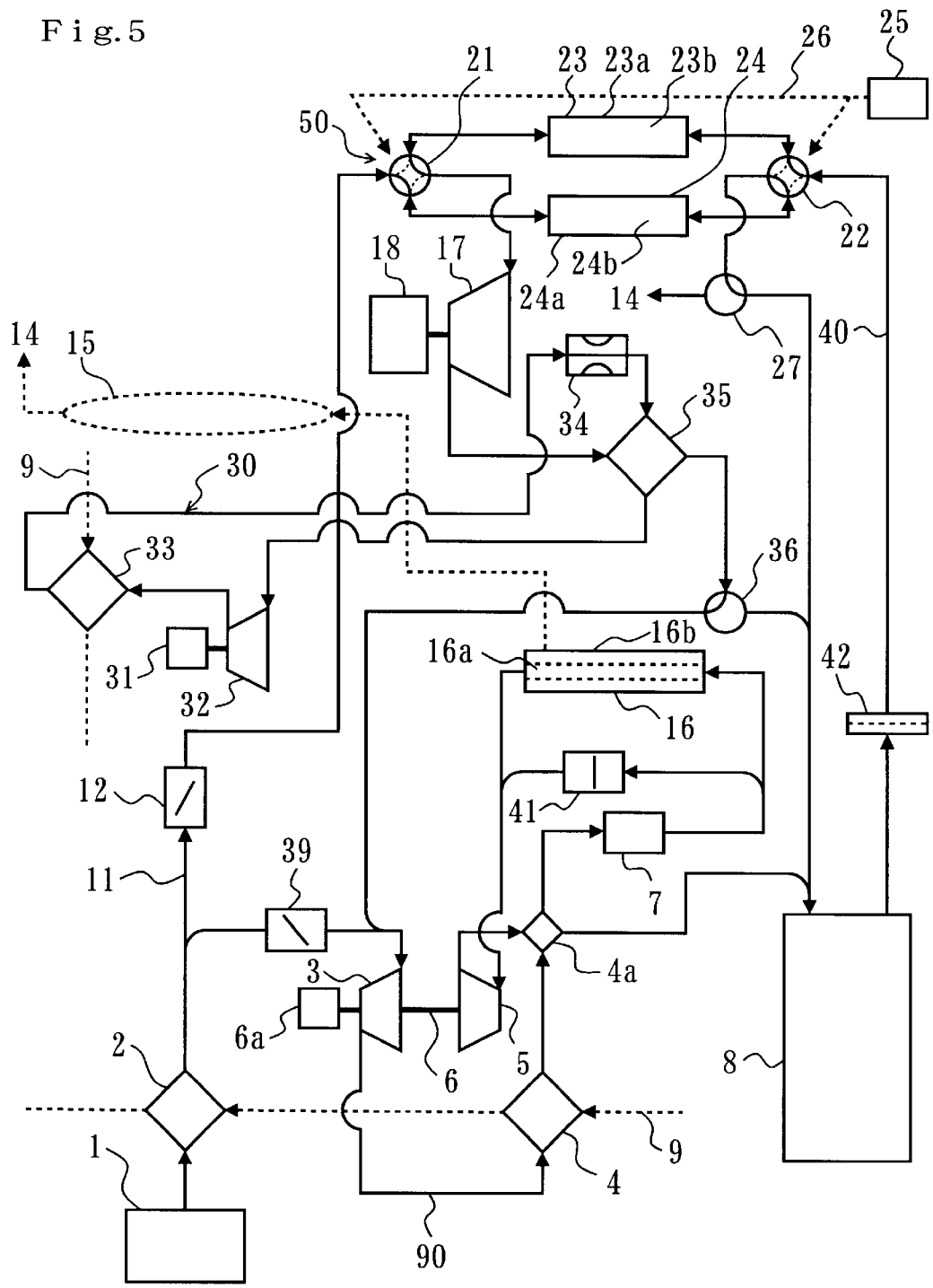
FIG. 5 is a layout diagram of the aircraft air conditioner according to the third embodiment of the present invention when the aircraft is cruising at high altitude.
Figure 6:
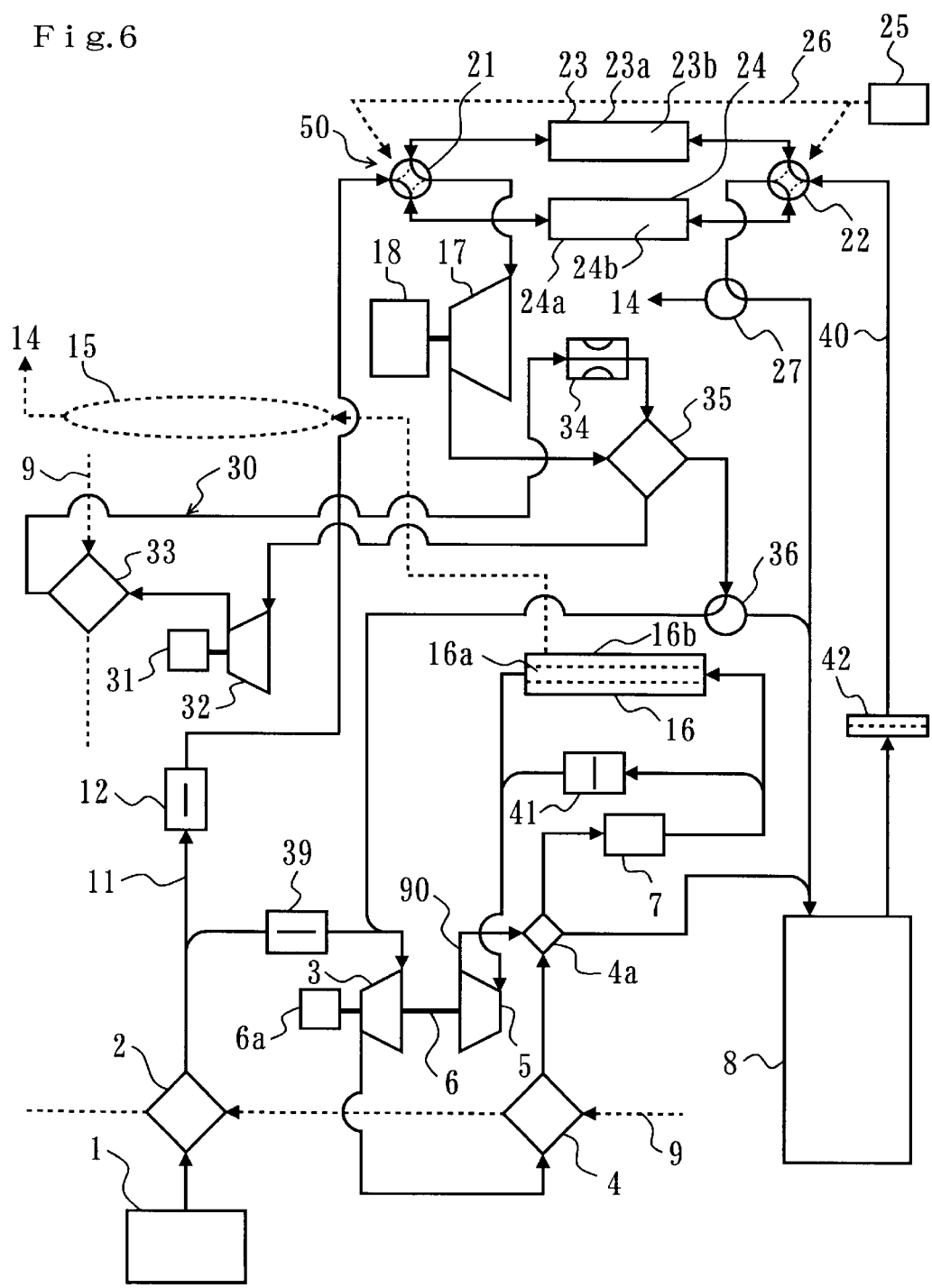
FIG. 6 is a layout diagram of the aircraft air conditioner according to the third embodiment of the present invention when the aircraft is descending.

FIG. 3 to FIG. 6 illustrate an aircraft air conditioner according to a third embodiment of the present invention. Parts which are the same as in the first embodiment are shown with the same reference symbols and the points of difference are described. FIG. 3 shows the condition when the aircraft is on the ground, FIG. 4 shows the condition when it is climbing after take-off, FIG. 5 shows the condition of cruising at high altitude and FIG. 6 shows the condition when descending.

In the aircraft air conditioner of this embodiment, air extracted from the engine 1 is cooled by a heat exchanger called a pre-cooler 2 and is compressed practically adiabatically by a radial compressor 3 after adjustment of the flow rate by a flow rate control valve 39. The degree of opening of this flow rate control valve 39 can be adjusted by means of a signal from a controller 25. The air which has thereby been raised in temperature is cooled by a heat exchanger called a main cooler 4 then cooled by a regenerating heat exchanger 4a and fed to a water separator 7 for moisture capture. The extracted air fed to this water separator 7 is fed to an opening/closing valve 41 and an air separating section 16. The degree of opening of this opening/closing valve 41 is adjusted by means of a signal from the controller 25. The air remaining in this air separating section 16 without passing through the selectively permeable membrane 16a and the air flowing out from this opening/closing valve 41 are practically adiabatically expanded by an expansion turbine 5, and cooled air is thereby obtained. This cooled air is fed into a cabin 8 including a cockpit space of the aircraft through a regenerating heat exchanger 4a. Cooling by external air passing through a ram air flow path 9 is performed in the pre-cooler 2 and main cooler 4. The expansion work of the expansion turbine 5 is utilized as compressive power by being transmitted to the compressor 3 through a shaft 6. A motor 6a for supplementing the necessary power for driving the compressor 3 is mounted on the shaft 6 connecting the compressor 3 with the turbine 5. When the aircraft descends, the pressure of the extracted air from the engine 1 is low, so pressurization can be effected up to the pressure that is appropriate for the air separating section 16 by the power assistance provided by the motor 6a.

It is arranged that when the engine is stopped with the aircraft on the ground, extracted air from a pressurized air supply unit such as an APU instead of the engine 1 can be supplied to the air conditioner.

A bypass air flow path 11 is provided for feeding extracted air from the engine 1 to the cabin 8 without passing through the air cycle cooling device. This bypass air flow path 11 is opened/closed by means of a hot air modulating valve 12. The degree of opening of this hot-air modulating valve 12 is made adjustable by means of a signal from the controller 25. In this way, the flow rate of the air flowing through the bypass air flow path 11 can be adjusted. Some of the extracted air is fed into the bypass air flow path 11 by opening the hot-air modulating valve 12, without being cooled by the air cycle cooling device constituted by the compressor 3 and expansion turbine 5. The air within the cabin 8 flows out through an outflow air flow path 40 in an amount corresponding to the difference, which is obtained by subtracting the amount discharged from an air flow path to outside the fuselage and the amount of leakage from the fuselage from the amount supplied by the air conditioner. In the outflow air flow path 40, dust and odors are removed from the air by means of a filter 42.

A first adsorption section 23 and a second adsorption section 24 are connected to the bypass air flow path 11 and the outflow air flow path 40 through an air flow path changeover mechanism 50. The air flow path changeover mechanism 50 of this embodiment comprises a first changeover valve 21 and a second changeover valve 22. Each of the adsorption section 23, 24 is provided with adsorption agent 23b, 24b packed in a container 23a, 24a. Each adsorption agent 23b, 24b adsorb molecules contained in the air and release the adsorbed molecules by being raised in temperature to more than the temperature on adsorption. For example, the adsorption sections 23, 24 can be constituted of a water molecule adsorbing substance such as silica gel and/or an oxygen molecule adsorbing substance such as zeolite. In this embodiment, water molecule adsorption substance is used as the adsorption agent 23b, 24b.

By means of the air flow path changeover mechanism 50, each of the adsorption sections 23, 24 is made to be capable of being changed over between a condition connected to the bypass air flow path 11 and a condition connected to the outflow air flow path 40. In this embodiment, the bypass air flow path 11 is alternately connected with the first adsorption section 23 and the second adsorption section 24 so that the extracted air flowing through the bypass air flow path 11 passes alternately through the first adsorption section 23 and the second adsorption section 24. Also, the outflow air flow path 40 is alternately connected with the first adsorption section 23 and the second adsorption section 24 so that the air flowing through the outflow air flow path 40 is alternately passed through the first adsorption section 23 and the second adsorption section 24.

The first changeover valve 21 is changed over between a first condition shown by broken lines in the figure and a second condition shown by solid lines in the figure. In the first condition, air fed to the bypass air flow path 11 from the engine 1 is fed to the first adsorption section 23, and air flowing out from the second adsorption section 24 is fed to a compressor 17 for compressing prior to mixing. In this second condition, air that is fed to the bypass air flow path 11 from the engine 1 is fed to the second adsorption section 24, and air that flows out from the first adsorption section 23 is fed to the compressor 17.

The second changeover valve 22 is changed over between a first condition indicated by broken lines in the figure and a second condition indicated by solid lines in the figure. In this first condition, air flowing out from the first adsorption section 23 is fed to a third changeover valve 27, and air flowing out from the cabin 8 is fed to the second adsorption section 24. In this second condition, air flowing out from the second adsorption section 24 is fed to the third changeover valve 27 and air flowing out from the cabin 8 is fed to the first adsorption section 23.

The air flow path changeover mechanism 50 is controlled by the controller 25 mounted on the aircraft. By means of this control, each of the adsorption sections 23 and 24 is changed over between a condition connected to the bypass air flow path 11 and a condition connected to the outflow air flow path 40. That is, the two changeover valves 21 and 22 are changed over between the first condition and second condition by means of changeover signals sent at set time intervals set by means of an incorporated timer or the like in the controller 25. When the first changeover valve 21 is in the first condition, the second changeover valve 22 is in the first condition. When the first changeover valve 21 is in the second condition, the second changeover valve 22 is in the second condition. Specifically, the air flow path changeover mechanism 50 is controlled such that, when the extracted air flowing in the bypass air flow path 11 passes through one of the two adsorption sections 23, 24, the air flowing in the outflow air flow path 40 passes through the other of the two adsorption sections 23, 24, and when the extracted air flowing in the bypass air flow path 11 passes through the other of the two adsorption sections 23, 24, the air flowing in the outflow air flow path 40 passes through the aforementioned one of the two adsorption sections 23, 24.

In this way, after being fed to one or other of the two adsorption sections 23, 24 through the first changeover valve 21, the extracted air that is fed to the bypass air flow path 11 by opening of the hot-air modulating valve 12 is fed to the second changeover valve 22. The air that is fed to the second changeover valve 22 from the adsorption sections 23, 24 is fed to the third changeover valve 27. The third changeover valve 27 is capable of changing over the air flow path between a condition in which the air that is fed thereto is released to the space 14 outside the fuselage and a condition in which it is fed to the cabin 8, under the control of a signal from the controller 25.

The air flowing out from the cabin 8 to the outflow air flow path 40 is fed to one or other of the two adsorption sections 23, 24 from the second changeover valve 22, and is then fed to the compressor 17 driven by the motor 18. The air that has been raised in pressure by the compressor 17 is cooled by an evaporator 35 of a vapor cycle heat exchanger unit 30 before being fed to a fourth changeover valve 36. The fourth changeover valve 36 is capable of changing over the air flow path between a condition in which the air that is fed thereto is fed to the cabin 8 and a condition in which it is fed to the air cycle cooling device, under the control of a signal from the controller 25. The heat exchanger unit 30 is constituted by a cooling cycle using a refrigerant such as HFC134a. Specifically, the refrigerant is compressed by a compressor 32 driven by a motor 31 and condensed in a condenser 33 by discharge of its heat to the air outside the fuselage through the ram air flow path 9. The temperature of the compressed refrigerant is lowered by pressure reduction with an expansion valve 34. The refrigerant that has thus been brought to a low temperature is evaporated by adsorption of heat from the air as described above in the evaporator 35.

A recirculation air flow path is constituted so that air flowing out through the outflow air flow path 40 from the cabin 8 is returned to the cabin 8 through the fourth changeover valve 36. Specifically, the fourth changeover valve 36 effects changeover between the case where air flowing out from the cabin 8 is returned directly to the cabin 8 and the case where the air is returned to the cabin 8 through the air cycle cooling device. In this way, the air flowing out from the cabin 8 becomes recirculation air that returns to the cabin 8. This recirculation air flow path and the air flow path of the extracted air from the engine 1 are connected to each other so that the recirculation air that is returned to the cabin 8 after flowing out from the cabin 8 is mixed with the extracted air. In this embodiment, the recirculation air that is fed to the air cycle cooling device through the fourth changeover valve 36 is mixed with the extracted air supplied through the flow rate control valve 39. This mixture of the recirculation air and the extracted air is fed into the air separating section 16 after being practically adiabatically compressed by the compressor 3 of the air cycle cooling device.

The temperature of the extracted air fed into the bypass air flow path 11 through the pre-cooler 2 from the engine 1 is 100° C. to 140° C., and the temperature of the air fed into the outflow air flow path 40 from the cabin 8 is 20° C. to 30° C. In this way, the adsorption agent 23b, 24b adsorbs active constituents (in this case water molecules) contained in the air flowing out from the cabin 8, when its temperature is lowered by the air flowing out from the cabin 8 and passing through therein. The adsorption agent 23b, 24b releases the water molecules adsorbed from the air flowing out from the cabin 8 into the extracted air and is thus regenerated, when its temperature is heightened by the extracted air flowing out from the engine 1 and passing through therein. For example, if the adsorption agent 23b, 24b is silica gel, 1.0 kg of silica gel can adsorb 0.25 kg or more of water molecules at 20° C., but 1.0 kg of silica gel can only adsorb 0.02 kg or less of water molecules at 100° C. In this way, water molecules in the air flowing out from the cabin 8 are adsorbed by the adsorption agent 23b, 24b and returned to the cabin 8 by being released into the air extracted from the engine 1, thereby improving the comfort of the cabin 8. In addition, the adsorption agent 23b, 24b is regenerated so that it can be used again. If zeolite, which functions as an oxygen molecule adsorbing substance, is employed for the adsorption agent 23b, 24b, the oxygen molecules in the air flowing out from the cabin 8 are adsorbed by the adsorption agent 23b, 24b and returned to the cabin 8 by being released into the air extracted from the engine 1, thereby improving comfort of the cabin 8. In addition, the adsorption agent 23b, 24b is regenerated so that it can be re-used. Also, comfort of the cabin 8 can be even further improved by constituting the adsorption sections 23, 24 both of adsorption agent that can adsorb water molecules and adsorption agent that can adsorb oxygen molecules, thereby enabling both moisture and oxygen to be adsorbed. In this case, preferably silica gel and zeolite are arranged in alternate layer fashion.

The air separating section 16 in this embodiment is assumed to be of large processing capacity and suitable for a large aircraft. This air separating section 16 is constructed by covering a selectively permeable membrane 16a comprised of a large number of bundled hollow fibers with a housing 16b to generate nitrogen-enriched gas and oxygen-concentrated air. Consequently, the permeability of the selectively permeable membrane 16a for the nitrogen ($N_2$) and for the carbon dioxide ($CO_2$) in the air is higher than that for oxygen ($O_2$). In this way, the extracted air that has passed through the water separator 7 after being cooled by the regenerating heat exchanger 4a can be converted into nitrogen-enriched gas (in this embodiment of $N_2$=92% or more) by passing through the selectively permeable membrane 16a. This nitrogen-enriched gas is discharged to the space 14 outside the fuselage by passing through a discharge flow path after being fed to the fuel peripheral region 15 such as the interior of the fuel tank or fuel pipe setup region. The oxygen concentration of the air that has not passed through the selectively permeable membrane 16a is raised. This oxygen-concentrated air, whose oxygen concentration has been increased, is fed to the expansion turbine 5. The air flow rate passing through the selectively permeable membrane 16a can be adjusted by making the degree of opening of the opening/closing valve 41 adjustable by means of a signal from the controller 25. The outside of the selectively permeable membrane 16a is of practically the same pressure as the pressure outside the fuselage, like fuel peripheral region 15.

In the cooling condition on the ground shown in FIG. 3, the air cycle cooling device constituted by the compressor 3 and expansion turbine 5 can be fully actuated by putting the flow rate control valve 39 in open condition.

In this case, the degree of opening of the opening/closing valve 41 can be selected as required. Specifically, by fully opening the opening/closing valve 41, arrangement can be made such that air is not introduced into the air separating section 16. This can therefore be associated with the case in which additional supply of nitrogen-enriched gas to the fuel peripheral region 15 is unnecessary, since the empty volume in the interior of the fuel tank becomes small because of fuel being loaded on the ground, there is no change in atmospheric pressure, and fuel consumption is minimal even including taxiing.

Alternatively, by closing the opening/closing valve 41, air can be introduced into the air separating section 16. In this way, safety can be improved by diluting the fuel gas evaporated from the fuel tank with nitrogen-enriched gas supplied from the air separating section 16 whilst the aircraft is in standby on the ground.

When there is high temperature and high humidity on the ground, moisture in the air can be released to outside the fuselage by closing the opening/closing valve 41, because the moisture permeability of the selectively permeable membrane 16a is high. In this way, the moisture in the air introduced into the expansion turbine 5 is reduced and the generation of heat of condensation is reduced, so that the cooling capacity can be increased and the humidity in the cabin 8 can be reduced.

Also, in cooling conditions on the ground at high temperature and high humidity, regeneration of the adsorption agent 23b, 24b can be performed by opening the hot-air modulating valve 12 somewhat. Air containing a lot of moisture that is used for this regeneration is discharged to the space 14 outside the fuselage through the third changeover valve 27. In this way, in the case of cooling on the ground, the moisture within the cabin 8 is captured and discharged by the adsorption sections 23, 24, so comfort can be improved by suppressing the rise of humidity within the cabin 8 and furthermore lowering of the cabin cooling capacity can be prevented by preventing dew formation in the evaporator 35 of the heat exchanger unit 30. Full actuation of the heat exchanger unit 30 can thereby be permitted, whereby the cooling capacity of the cabin 8 is increased in combination with the air cycle cooling device. Also, the moisture-expelled air flowing out from the adsorption sections 23, 24 after flowing out from the cabin 8 is made flow back to the cabin 8 from the fourth changeover valve 36.

In the condition shown in FIG. 4 in which the aircraft has taken off and is climbing, the output of the engine 1 is raised, so the pressure of the extracted air becomes high. Consequently, the expansion ratio in the turbine 5 of the air cycle cooling device becomes large and therefore lower temperature air is supplied. In this case, it is necessary to prevent excessive lowering of the temperature within the cabin 8 by the air supplied from the air cycle cooling device. Also, in the condition in which the aircraft is climbing, the temperature of the external air and its water vapor content are rapidly falling, so it is necessary to prevent excess drop of humidity within the cabin 8. Consequently, the warm extracted air containing water vapor regenerated in the adsorption sections 23, 24 is supplied to the cabin 8 through the third changeover valve 27. Also, by making the heat exchanger unit 30 behave in accordance with conditions during ascent of the aircraft, the moisture-removed air flowing out from the adsorption sections 23, 24 after flowing out from the cabin 8 is made to flow back to the cabin 8 from the changeover valve 36, so the cabin 8 is maintained at the appropriate temperature and humidity.

Also, in climbing conditions, by gradually throttling the degree of opening of the opening/closing valve 41, the air that is supplied to the air separating section 16 is gradually increased. In this way, nitrogen-enriched gas is supplied from the air separating section 16 to the fuel peripheral region 15 in an amount in accordance with the fuel consumption. Furthermore, since the pressure of supply of the extracted air is high, if the expansion energy of the expansion turbine 5 is considerably higher than the compression work of the compressor 3, energy recovery by making motor 6a function as a generator is also possible.

In the condition when cruising at high altitude shown in FIG. 5, the moisture-removed air flowing out from the adsorption sections 23, 24 after flowing out from the cabin 8 is fed to the compressor 3 from the changeover valve 36 after being increased in pressure by the compressor 17. In this way, the rate of air fed into the air cycle cooling device and the air separating section 16 can be guaranteed, even if the rate of air extraction from the engine 1 is reduced after completion of ascent by throttling the output of engine 1. At this point, the opening/closing valve 41 is throttled considerably. Oxygen-concentrated air from the air separating section 16 is fed to the expansion turbine 5. In addition, air whose humidity has been increased in the adsorption sections 23, 24 is fed to the cabin 8 from the third changeover valve 27. In this way, the rate of air supply to the cabin 8 is guaranteed, so lowering of oxygen partial pressure within the cabin 8 is prevented and furthermore comfort can be maintained by maintaining the humidity. Also, nitrogen-enriched gas from the air separating section 16 is supplied to the fuel peripheral region 15.

Preferably, since the air outside the fuselage is at low temperature when cruising at high altitude, a valve that throttles the air outside the fuselage flowing into the heat exchangers 2, 4 or a flow path changeover valve with a bypass flow path for allowing the air outside the fuselage to bypass the heat exchangers 2, 4 is provided in the ram air path.

In the condition shown in FIG. 6 in which the aircraft is descending, the empty volume in the interior of the fuel tank becomes large as a result of consumption of fuel and atmospheric pressure rises due to the descent, so supply of a large quantity of nitrogen-enriched gas to the fuel peripheral region 15 is necessary. Furthermore, since the output of the engine 1 is severely throttled during descent, pressure of the extracted air supplied to the air cycle cooling device is low, making it difficult to ensure the rate of air extraction. Accordingly, the drop in the rate of air extraction in the air cooling device is made up by increasing the rate of supply of the recirculation air by feeding air flowing out from the cabin 8 to the compressor 3 via the changeover valve 36. Also, nitrogen enriched gas is supplied from the air separating section 16 to the fuel peripheral region 15 by fully closing the opening/closing valve 41. In addition, drop in the rate of air supply to the cabin 8 is prevented by feeding air humidified in the adsorption sections 23, 24 from the third changeover valve 27 to the cabin 8. In this case, the temperature of the cabin 8 is regulated by operating the heat exchanger unit 30 so that excessive heating is not applied to the cabin 8.

According to the third embodiment described above, necessary constituent molecules contained in the air flowing out from the cabin 8 can be returned into the cabin 8. Also, the adsorption agent 23b, 24b is regenerated so that these molecules in the air can again be adsorbed. The adsorption and release of water molecules by the adsorption agent 23b, 24b contribute to maintaining humidity within the cabin 8. If oxygen molecules are adsorbed and released by the adsorption agent 23b, 24b, this can contribute to maintaining the oxygen concentration in the cabin 8. Furthermore, regeneration of the air within the cabin 8 can be achieved by a straightforward construction merely involving addition of the adsorption sections 23, 24 and the air flow path changeover mechanism 50. The air flow rate flowing through the bypass air flow path 11 is made adjustable, so that it is possible to maintain an appropriate temperature within the cabin 8 by adjusting the ratio of the rate of air fed into the cabin 8 after cooling by the air cycle cooling device to the rate of air fed into the cabin 8 without such cooling.

Also, it is possible to prevent occurrence of fuel fires by the nitrogen-enriched gas separated by the selectively permeable membrane 16a. The oxygen-concentrated air separated by the selectively permeable membrane 16a contributes to maintaining the oxygen concentration within the cabin 8 (i.e. the oxygen partial pressure is maintained at the level on the ground even though the atmospheric pressure within the aircraft has become a pressure lower than that on the ground). At least water molecules in the air flowing out from the cabin 8 through the outflow air flow path 40 is adsorbed by the adsorption agent 23b, 24b. After passing through the adsorption sections 23, 24, the air flowing out from the cabin 8 is compressed by the compressor 17 and is furthermore raised in pressure by the compressor 3, before being supplied to the selectively permeable membrane 16a of the air separating section 16. In this way, the air flowing out from the cabin 8 can be again fed into the cabin 8 as oxygen-concentrated air, so the necessary air flow rate to control the pressure within the cabin 8 can be ensured without increasing the rate of air extraction from the engine 1. Also, nitrogen-enriched gas can be efficiently obtained by compressing the air fed to the selectively permeable membrane 16a. Furthermore, when the rate of air extraction from the engine 1, the temperature, the humidity, the oxygen concentration and/or the pressure of the external air change in accordance with the flying conditions of the aircraft, the temperature, humidity, oxygen concentration and pressure within the cabin 8 can be optimally maintained. In addition, when the extracted air containing the moisture released from the adsorption agent 23b, 24b is excessively humid, dew formation of the air cycle cooling device can also be prevented by releasing it to the space 14 outside the fuselage.

According to the third embodiment described above, the oxygen-concentrated air from which nitrogen is separated by the air separating section 16 can be effectively utilized by being returned to the cabin 8. Also, when both the air cycle cooling device and the air separating section 16 are functioning, the load on engine 1 can be reduced by suppressing increase of the rate of air extraction from the engine 1. By utilizing the compressor 3 of the air cycle cooling device, the pressure of the mixture of the recirculation air and the extracted air can be increased up to the pressure needed for separating the air constituents by the selectively permeable membrane 16a of the air separating section 16. Also, the recirculation air is pressurized to about the same pressure as the pressure of the extracted air by the compressor 17 prior to the mixing with the extracted air, so that backflow of the recirculation air can be prevented and the mixing performed in a smooth manner. When the oxygen-concentrated air is expanded by the expansion turbine 5, the output of this expansion turbine 5 is employed as power for driving the compressor 3. The expansion work of the expansion turbine 5 can thereby be effectively utilized. Since the compressor 3 and the compressor 17 for compressing prior to mixing are supplied with the necessary power for driving from the motors 6a and 18, the difference obtained by subtracting the expansion work of the expansion turbine 5 from the total of compressive work of the compressor 3 of the cooling device and the compressive work of the compressor 17 can be made up by the power of these motors 6a, 18. In addition, the temperature of the air supplied to the cabin 8 can be suitably adjusted by cooling the recirculation air by the vapor cycle heat exchanger unit 30.

Figure 7:
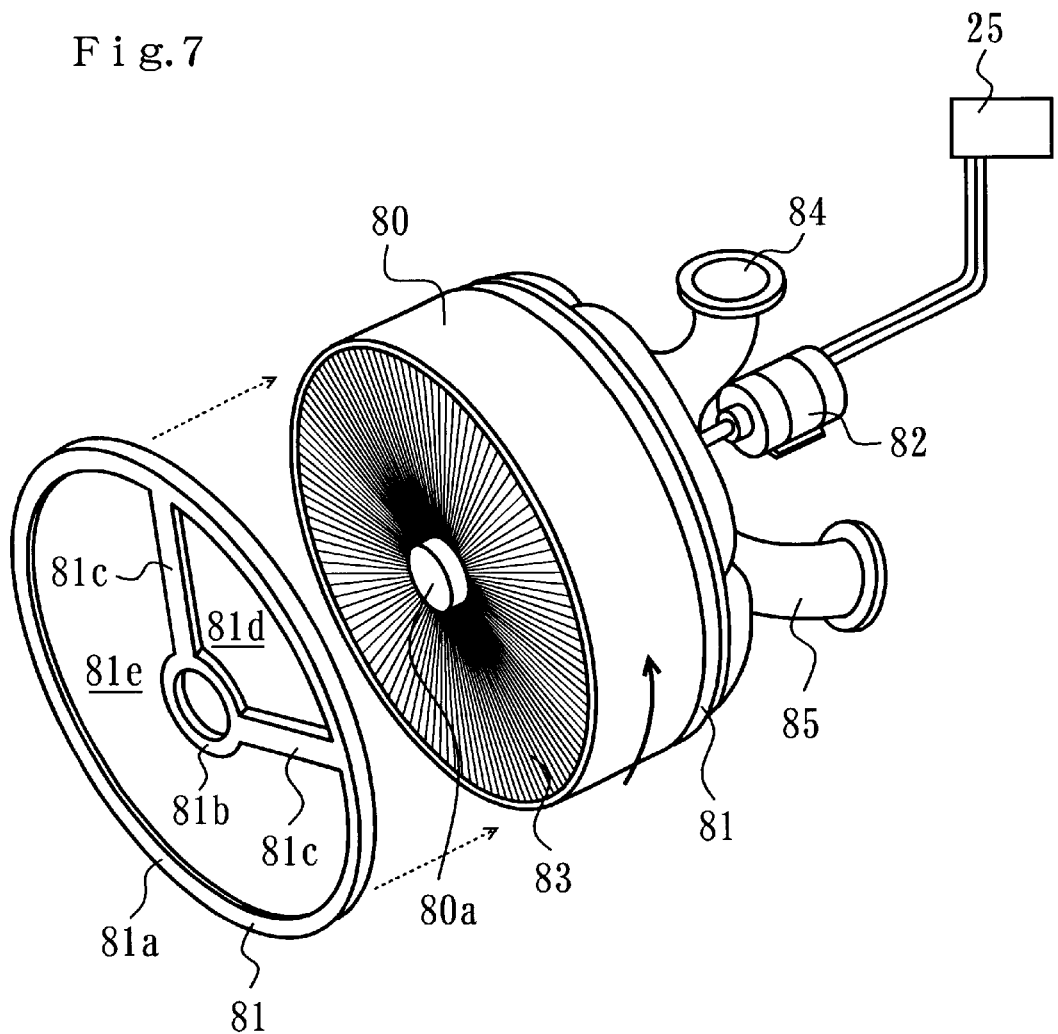
FIG. 7 is a layout diagram of an adsorption section in an aircraft air conditioner according to a modified example of the present invention.

FIG. 7 shows a modified example of the adsorption sections and air flow path changeover mechanism. In this modified example, a large number of adsorption sections 83 extending in the direction of the axis of rotation are provided in honeycomb fashion in the interior of a rotary drum 80. Adsorption agent such as silica gel is packed within the adsorption sections 83. Separators 81 are joined in relatively rotatable fashion via sealing members (not shown) at both end faces of this rotary drum 80. Each separator 81 is constituted by connecting an outer ring 81a with inner ring 81b via two arms 81c, and is fixed to the fuselage member of the aircraft. The central shaft 80a of the rotary drum 80 is rotatably supported via bearings (not shown) by the inner ring 81b of each of the separator 81. A motor 82 is connected with this central shaft 88, and the rotary drum 80 is rotated by this motor 82 being driven in response to a signal from the controller 25. Two regions 81d, 81e are defined by the two arms 81c between the outer ring 81a and inner ring 81b in each of the separators 81. One region 81d in each of the separators 81 is connected with the bypass air flow path 11 through a piping joint 84, while the other region 81e is connected with the outflow air flow path 40 through piping joint 85. In this way, an air flow path changeover mechanism is constituted wherein changeover is effected by rotation of this rotary drum 80 between a condition in which the adsorption sections 83 are connected with the bypass air flow path 11 and a condition in which they are connected with the outflow air flow path 40. Other details are the same as in the case of the embodiments described above.

Figure 8:
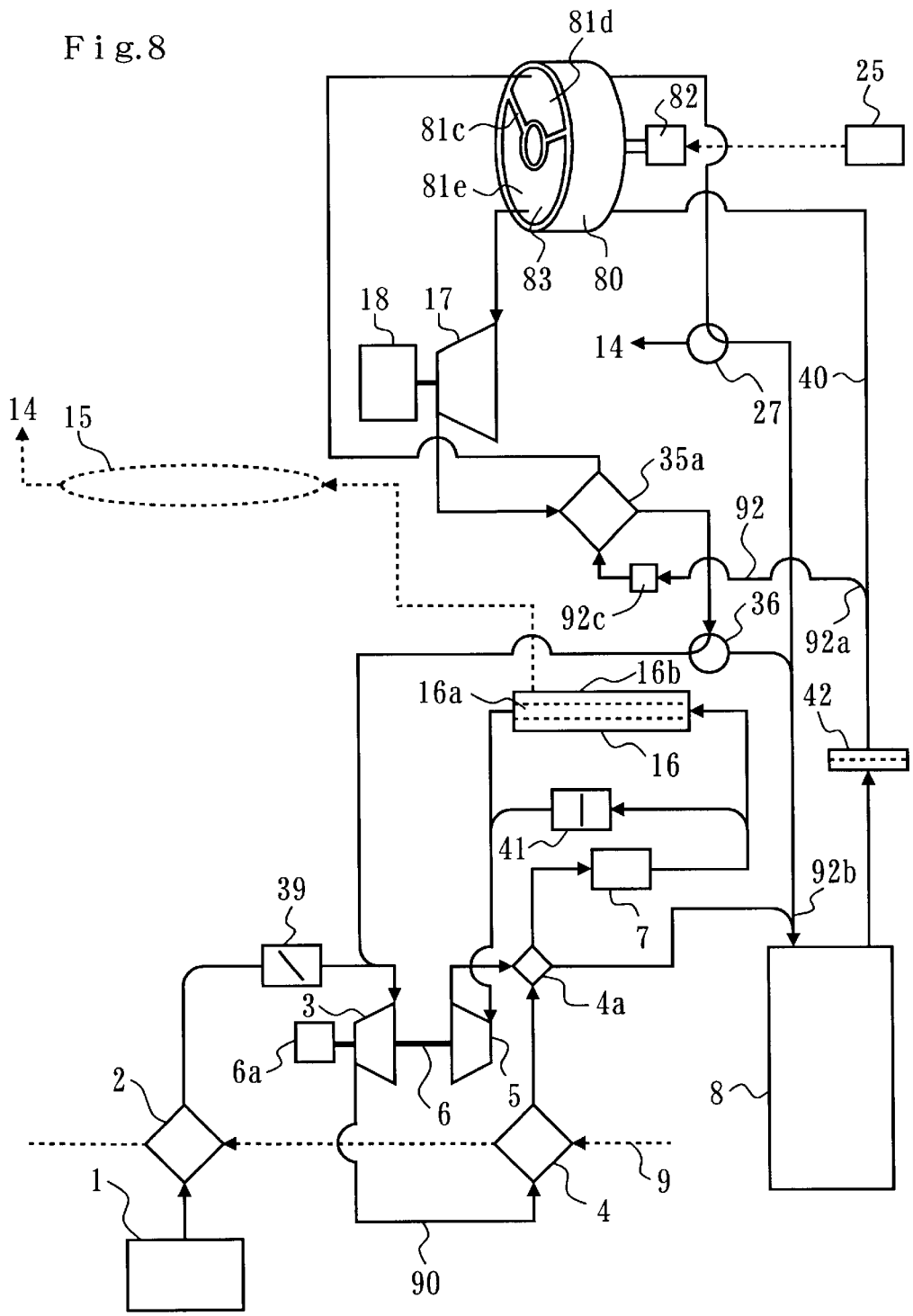
FIG. 8 is a layout diagram of an aircraft air conditioner according to a fourth embodiment of the present invention.

FIG. 8 shows an aircraft air conditioner according to a fourth embodiment of the present invention. Portions which are similar to the third embodiment described above are indicated by the same reference symbols and the points of difference are described.

In this fourth embodiment, a circulating air flow path 92 is provided as an auxiliary air flow path instead of the bypass air flow path 11 in the third embodiment. Also, instead of the adsorption sections 23, 24 and the air flow path changeover mechanism 50 in the third embodiment, an air flow path changeover mechanism employing the adsorption section 83 and rotary drum 80 illustrated in the modified example of FIG. 7 is employed. In addition, vapor cycle heat exchanger unit 30 is not used.

Specifically, in order to feed the air flowing out from the cabin 8 again into the cabin 8, one end 92a of the circulating air flow path 92 is connected to the outflow air flow path 40 downstream of the filter 42 and its other end 92b is connected to the cabin 8 together with the main air flow path 90. Also, a fan 92c for creating air flow is provided in the circulating air flow path 92. The fan 92c can be positioned at anywhere upstream of the third changeover valve 27 in the circulation air flow path 92.

One of the regions 81d in each of the separators 81 joined at both end faces of the rotating drum 80 is connected with the circulating air flow path 92, while the other region 81e is connected with the outflow air flow path 40. In this way, an air flow path changeover mechanism is constituted so that it changes over the adsorption section 83 within the rotary drum 80 by rotation of the rotary drum 80 between a condition connected with the circulating air flow path 92 and a condition connected with the outflow the air flow path 40.

The rotary drum 80 is rotated by the motor 82 in the air flow path changeover mechanism being controlled by the controller 25. By rotation of the rotary drum 80, the adsorption sections 83 are changed over between a condition connected with the circulating air flow path 92 and a condition connected with the outflow air flow path 40. When the adsorption sections 83 are connected with the circulating air flow path 92, the air that is fed into the circulating air flow path 92 from the cabin 8 is fed to the adsorption sections 83 and is fed to the third changeover valve 27 after passing through the adsorption sections 83. When the adsorption sections 83 are connected with the outflow air flow path 40, the air that flows out from the cabin 8 through the outflow air flow path 40 is fed to the adsorption sections 83 and is fed to the compressor 17 for compressing air prior to the mixing after passing through the adsorption sections 83. In this way, the compressor 17 constitutes compressing means that compresses air flowing out from the cabin 8 through the outflow air flow path 40 downstream of the adsorption sections 83. Downstream of the compressor 17, there is provided a heat exchanger 35*a* that performs heat exchange between air that is compressed by the compressor 17 and air flowing in the circulating air flow path 92. The air flowing in the circulating air flow path 92 is heated prior to passage through the adsorption agent packed in the adsorption sections 83 by means of the heat exchanger 35*a*. The air flowing out from the cabin 8 through the outflow air flow path 40 is fed into the fourth changeover valve 36 after being cooled in the heat exchanger 35*a*. Otherwise, the construction is the same as that of the third embodiment.

According to the fourth embodiment, the air flowing out from the cabin 8 through the circulating air flow path 92 is heated by the air compressed by the compressor 17, and this heated air is passed through the adsorption agent of the adsorption sections 83. Thus increased load on the engine can be prevented, since there is no need for consumption of air extracted from the engine for regenerating the adsorption agent. Also, since the air fed into the selectively permeable membrane 16*a* is compressed by the compressor 17 prior to the mixing with the air extracted from the engine 1, similar pressure to that of the air extracted from the engine 1 is obtained so that efficient mixing can be achieved. By cooling this compressed air by the air flowing out from the cabin 8 through the circulating air flow path 92, a considerable lowering in air temperature can be achieved after the compression. Therefore, even if recooling of this compressed air is necessary prior to the mixing, the cooling device for this purpose can be made small. When a large quantity of nitrogen-enriched gas is needed, the air that is required for regenerating the adsorption agent is increased because the flow rate of air whose moisture has been adsorbed by the adsorption agent of the adsorbing sections 83 is increased. In this case, the air that is compressed prior to being fed to the selectively permeable membrane 16*a* has also increased, so that the amount of heat that heats the air flowing out from the cabin 8 through the circulating air flow path 92 can be increased. The high temperature air needed to regenerate the adsorption agent can thus be guaranteed by heating the air. That is, a system of good air flow rate balance can be obtained. Apart from this, the same beneficial effects as in the case of the third embodiment can be obtained.

Figure 9:
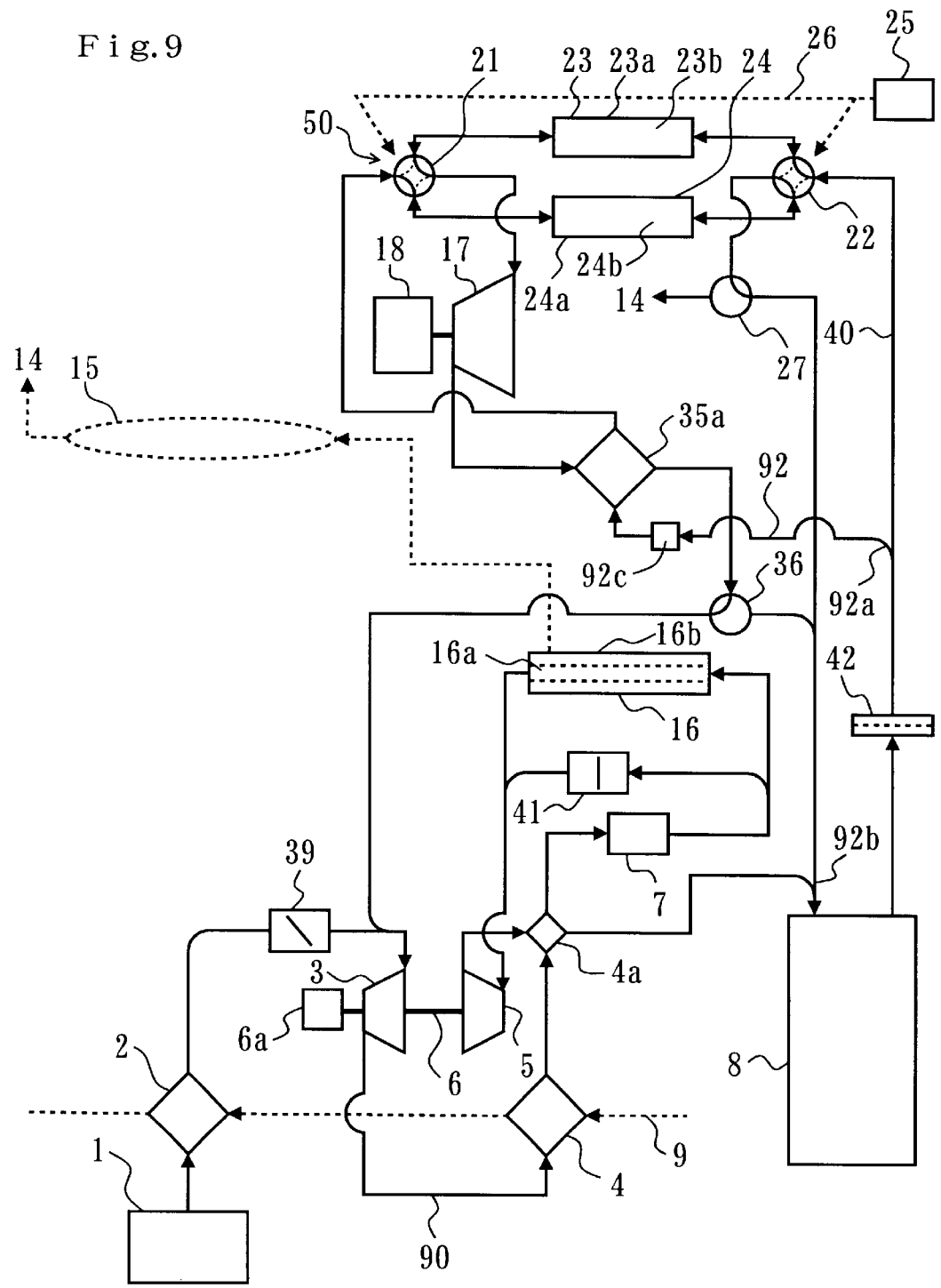
FIG. 9 is a layout diagram of an aircraft air conditioner according to a fifth embodiment of the present invention.

FIG. 9 illustrates an aircraft air conditioner according to a fifth embodiment of the present invention. Parts which are similar to the fourth embodiment are indicated by the same reference symbols and the points of difference are described.

In this fifth embodiment, instead of the air flow path changeover mechanism using adsorption sections 83 and rotary drum 80 in the fourth embodiment, an air flow path changeover mechanism 50 using adsorption sections 23, 24 and changeover valves 21, 22 in the third embodiment is employed. Apart from this, it is the same as the fourth embodiment. In this fifth embodiment, if temperature regulating piping for feeding the air extracted from the engine 1 into the cabin 8 through the pre-cooler 2 is provided, temperature regulation of the interior of the cabin 8 can be achieved by adjustment of the degree of opening of a valve provided in this temperature regulating piping. Also, if a mixing chamber is provided to mix the air fed into the cabin 8 through this temperature regulating piping, main air flow path 90, third changeover valve 27 and fourth changeover valve 36 prior to being fed into the cabin 8 is provided, more suitable values of the temperature and humidity of the air mixed in this mixing chamber can be achieved. Furthermore, the temperature and humidity of the air mixed in this mixing chamber can be made more suitable, by feeding the air in the cabin 8 into the mixing chamber by means of a fan provided in the piping. Also, a radiator can be provided to further cool the air flowing from the heat exchanger 35*a* into the fourth changeover valve 36 by means of ram air.

Figure 10:
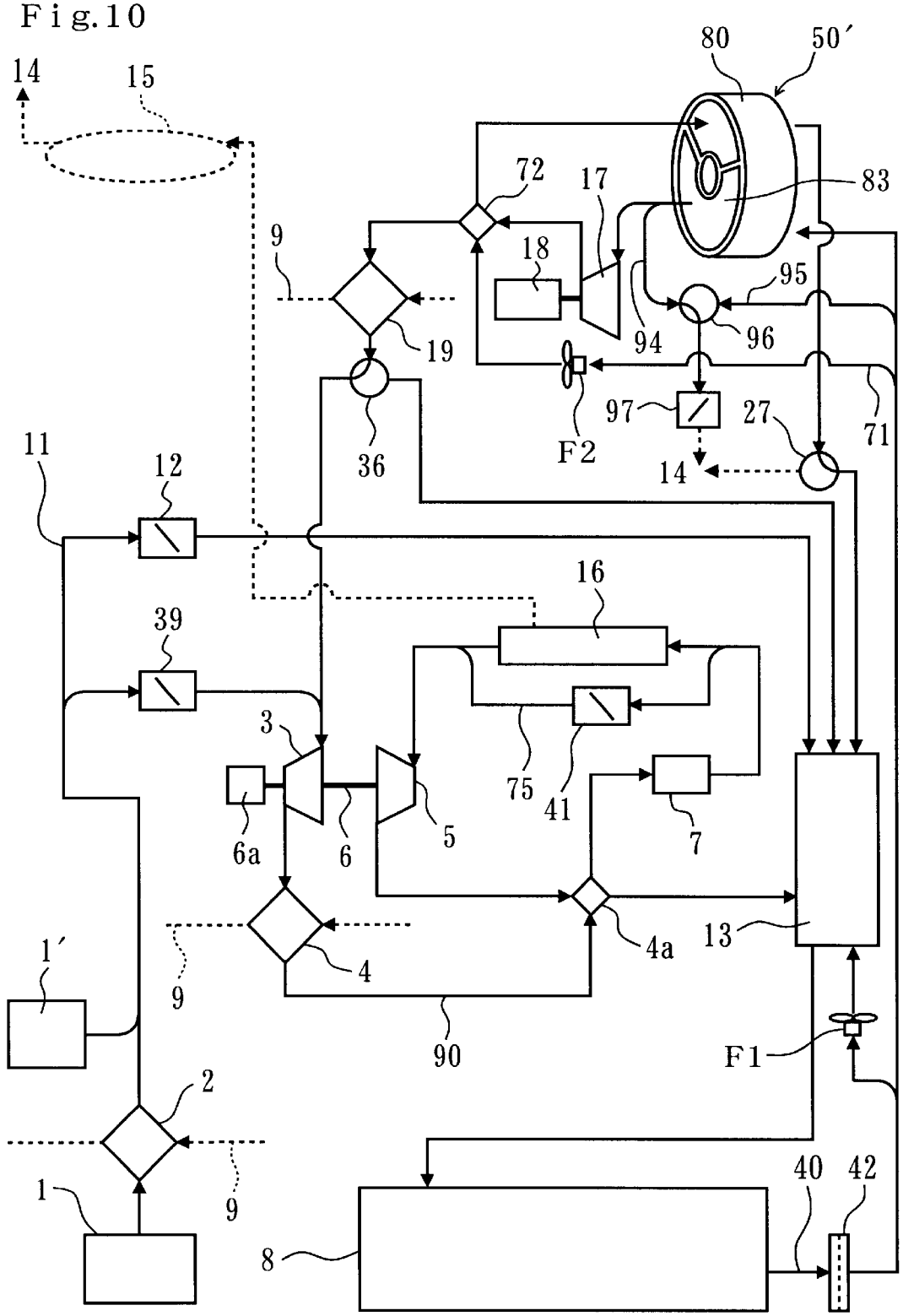
FIG. 10 is a layout diagram of an aircraft air conditioner according to a sixth embodiment of the present invention.

FIG. 10 illustrates an aircraft air conditioner according to a sixth embodiment of the present invention; portions which are the same as in the third embodiment are shown with the same reference symbols and the points of difference are described. In this sixth embodiment, when the aircraft is on the ground and the engine is stopped, air extracted from a high-pressure air supply unit 1' such as an APU instead of from the engine 1 is supplied to the air conditioner. Cold air flowing out from the turbine 5 is fed to the cabin 8 including the cockpit space of the aircraft, through a mixing chamber 13 from the regenerating heat exchanger 4*a*. Some of the air extracted from the engine 1 is fed to the cabin 8 through the mixing chamber 13 from the bypass air flow path 11 by opening the hot-air modulating valve 12.

Some of the air flowing out to the outflow air flow path 40 from the cabin 8 is fed to the mixing chamber 13 through a fan F1. An auxiliary air flow path 71 branched from the outflow air flow path 40 is connected with a regenerating heat exchanger 72. Some of the air flowing out through the outflow air flow path 40 from the cabin 8 is heated by the regenerating heat exchanger 72 after being fed to the auxiliary air flow path 71 by a fan F2.

The adsorption section 83 shown in FIG. 7 is connected through the air flow path changeover mechanism 50' to the auxiliary air flow path 71 and outflow air flow path 40. Specifically, one region 81*d* in each separator 81 is connected with the auxiliary air flow path 71 through the piping joint 84 while another region 81*e* is connected with the outflow air flow path 40 through the piping joint 85. In this way, the air flow path changeover mechanism 50' that changes over between a condition in which the adsorption sections 83 are respectively connected with auxiliary air flow path 71 and a condition in which they are connected with outflow air flow path 40 is constituted by rotation of the rotary drum 80.

The air that is fed to the adsorption section 83 from the auxiliary air flow path 71 through the regenerating heat exchanger 72 is fed to the third changeover valve 27. The third changeover valve 27 is capable of changing over the air flow path between a condition in which air that is fed thereto is discharged to the space 14 outside the fuselage and a condition in which it is fed to the cabin 8 through the mixing chamber 13, in response to a signal from the controller (not shown). The air that is fed into the adsorption section 83 from the outflow air flow path 40 is fed to the compressor 17 for compressing prior to mixing that is driven by the motor 18. Air that is raised in pressure by the compressor 17 is heat-exchanged with air flowing through the auxiliary air flow path 71 in the regenerating heat exchanger 72 and is cooled by air passing through the ram air path 9 outside the fuselage in a radiator 19 that acts instead of the heat exchanger unit 30 of the third embodiment; it is then fed to the fourth changeover valve 36. The fourth changeover valve 36 is capable of changing over the air flow path between a condition in which air that is fed thereto is fed to the cabin 8 through the mixing chamber 13 and a condition in which it is fed to the air cycle cooling device, in response to a signal from the controller.

The temperature of the air flowing through the auxiliary air flow path 71 is for example about 100° C. to 140° C., due to its being heated by the regenerating heat exchanger 72. The temperature of the air flowing in the outflow air flow path 40 from the cabin 8 is for example 20° C. to 30° C. Consequently, since it is at low temperature when the air that is fed through the outflow air flow path 40 from the cabin 8 is flowing, the adsorption agent in the adsorption section 83 absorbs active constituents (in this case water molecules) contained in the air flowing out from the cabin 8. In contrast, since it is at high temperature when the air that is fed through the auxiliary air flow path 71 is flowing, the adsorption agent in the adsorption section 83 releases the water molecules absorbed from the air introduced through the outflow air flow path 40 into the air introduced through the auxiliary air flow path 71 and is thus regenerated.

Upstream of the compressor 17 for compressing prior to mixing and downstream of the adsorption section 83, a first discharge air flow path 94 is branched from the outflow air flow path 40. Also, a second discharge air flow path 95 is branched from the outflow air flow path 40 upstream of the adsorption section 83. A changeover valve 96 that constitutes a discharge changeover mechanism is connected to the first discharge air flow path 94 and second discharge air flow path 95. An outflow valve 97 that constitutes a discharge mechanism is connected with this discharge changeover valve 96. This discharge changeover valve 96 is capable of being changed over between a first discharge condition and a second discharge condition in response to signals from the controller. When the discharge changeover valve 96 is in the first discharge condition, air that has passed through the first discharge air flow path 94 is fed to the outflow valve 97 and the flow of air from the second discharge air flow path 95 to the outflow valve 97 is cut off. When the discharge changeover valve 96 is in the second discharge condition, the flow of air from the first discharge air flow path 94 to the outflow valve 97 is cut off and air passing through the second discharge air flow path 95 is fed to the outflow valve 97. Incorporating the outflow valve 97 in the air conditioner in this way contributes to embodiment of the equipment as a whole in the form of an integrated unit.

The degree of opening of the outflow valve 97 is altered in response to signals from the controller. The controller determines the degree of opening of the outflow valve 97 in accordance with an appropriate value found by subtracting the rate of air leakage, the rate of supply of nitrogen-enriched gas to fuel peripheral region 15, and the rate of airflow if another outflow line is operated from the rate of the extracted air, based on for example the height of the aircraft found by an altimeter and the internal pressure of the cabin 8 detected by a pressure sensor. It should be noted that it could be arranged to find the value, which is obtained by subtracting the rate of air leakage and the rate of supply of nitrogen-enriched gas to fuel peripheral region 15 from the rate of the extracted air, directly using a flow rate sensor.

When the discharge changeover valve 96 is in the first discharge condition, some of the air flowing through the outflow air flow path 40 can be discharged to the space 14 outside the fuselage by means of the outflow valve 97 after passing through the adsorption section 83. In this way, since molecules contained in the air can be absorbed before the air is discharged to the space 14 outside the fuselage in order to maintain the pressure within the cabin 8 at a suitable level, molecules such as water or oxygen contained in this air can be re-used. The comfort of passengers can thereby be very greatly increased, since it becomes even easier to maintain the concentrations of for example water vapor or oxygen within the cabin 8 at their target values. In particular, lowering of the humidity when little water vapor is being generated in the cabin 8 due to the number of passengers being small can be effectively prevented.

Also, some of the air flowing through the outflow air flow path 40 can be changed over between a condition in which it is discharged to the space 14 outside the fuselage by the outflow valve 97 after passing through the adsorption section 83 and a condition in which it is discharged to the space 14 outside the fuselage by the outflow valve 97 without passing through the adsorption section 83. In this way, when the need to re-use molecules contained in the fuselage air is high, fuselage air can be discharged to the space 14 outside the fuselage after passing through the adsorption section 83, and when the need for such re-use is low the fuselage air can be discharged to the space 14 outside the fuselage without passing through the adsorption section 83. For example, when flying at high altitude, the fuselage air is discharged to the space 14 outside the fuselage after passing through the adsorption section 83, and when on the ground at high temperature and high humidity the fuselage air can be discharged to the space 14 outside the fuselage without passing through the adsorption section 83. That is, the discharged air can also contribute to the discharge of excess moisture to the space 14 outside the fuselage. In addition, air that has passed through the auxiliary air flow path 71 and that contains moisture due to regeneration of the adsorption section 83 can be discharged to the space 14 outside the fuselage through the third changeover valve 27. Thus the humidity within the cabin 8 can be maintained in a comfortable range by raising the cooling capability by decreasing the rate of dew formation within the air conditioner, by discharging of excess water vapor when on the ground under high temperature and high humidity etc. to the space 14 outside the fuselage.

Figure 11:
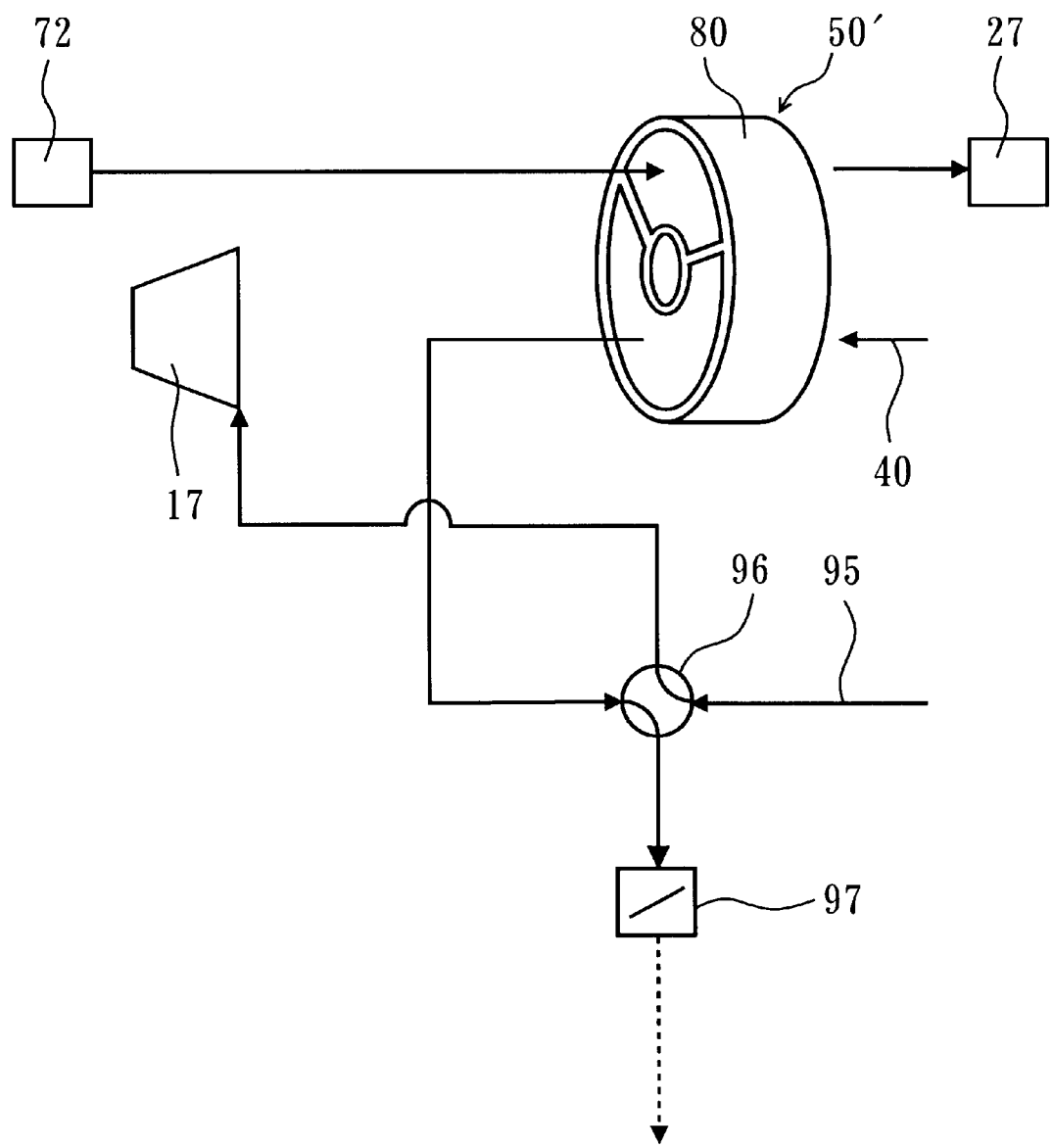
FIG. 11 is a view showing a discharge changeover valve and outflow valve in a first discharge condition in a modified example of the sixth embodiment of the present invention.
Figure 12:
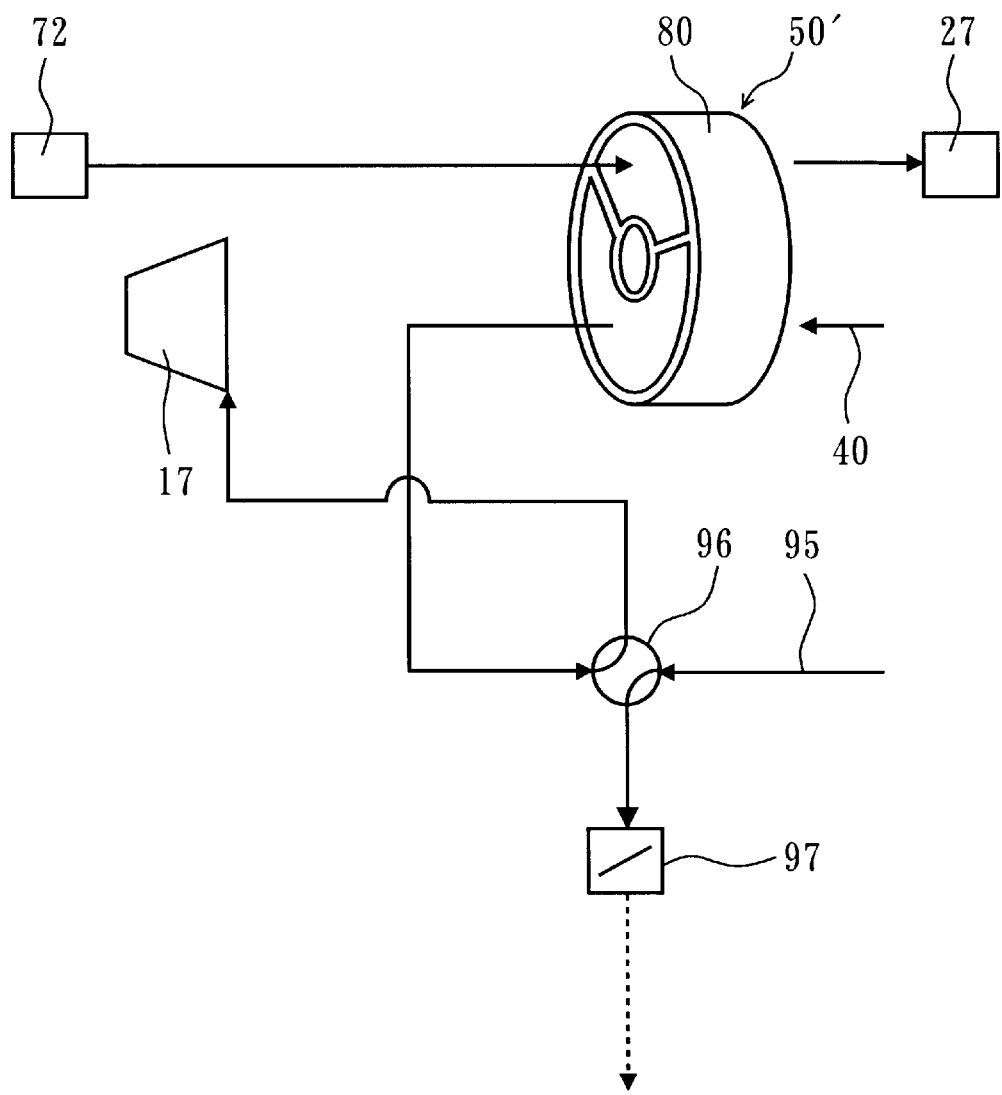
FIG. 12 is a view showing a discharge changeover valve and outflow valve in a second discharge condition in the modified example of the sixth embodiment of the present invention.

FIG. 11 and FIG. 12 illustrate a discharge mechanism and discharge changeover mechanism according to a modified example of the sixth embodiment. In this modified example, the first discharge air flow path 94 is not provided. The discharge changeover valve 96 is connected to the outflow air flow path 40 upstream of the compressor 17 for compressing prior to mixing and downstream of the adsorption section 83. The second discharge air flow path 95 and outflow valve 97 are connected to the discharge changeover valve 96. When the discharge changeover valve 96 is in the first discharge condition shown in FIG. 11, all of the air flowing through the outflow air flow path 40 that has passed through the adsorption section 83 is fed to the outflow valve 97 and the air flowing through the second discharge air flow path 95 is fed to the compressor 17 for compressing prior to mixing through the outflow air flow path 40. When the discharge changeover valve 96 is in the second discharge condition shown in FIG. 12, all of the air that has passed through the adsorption section 83 flowing through the outflow air flow path 40 is fed to the compressor 17 for compressing prior to mixing and the air flowing through the second discharge air flow path 95 is fed to the outflow valve 97. By putting the discharge changeover valve 96 into the first discharge condition at high altitudes, moisture or oxygen in the air can be effectively recovered. Also, by putting the discharge changeover valve 96 in the second discharge condition when on the ground under high temperature and high humidity, excess water vapor can be discharged to the space 14 outside the fuselage and, in addition, air that has passed through the auxiliary air flow path 71 including moisture due to regeneration of the adsorption section 83 can be discharged to the space 14 outside the fuselage through the third changeover valve 27. In this way, excess water vapor is effectively discharged to the space 14 outside the fuselage and the rate of dew formation within the air conditioner is decreased, thereby increasing its cooling capacity and making it possible to maintain the humidity within the cabin 8 in a comfortable range.

Figure 13:
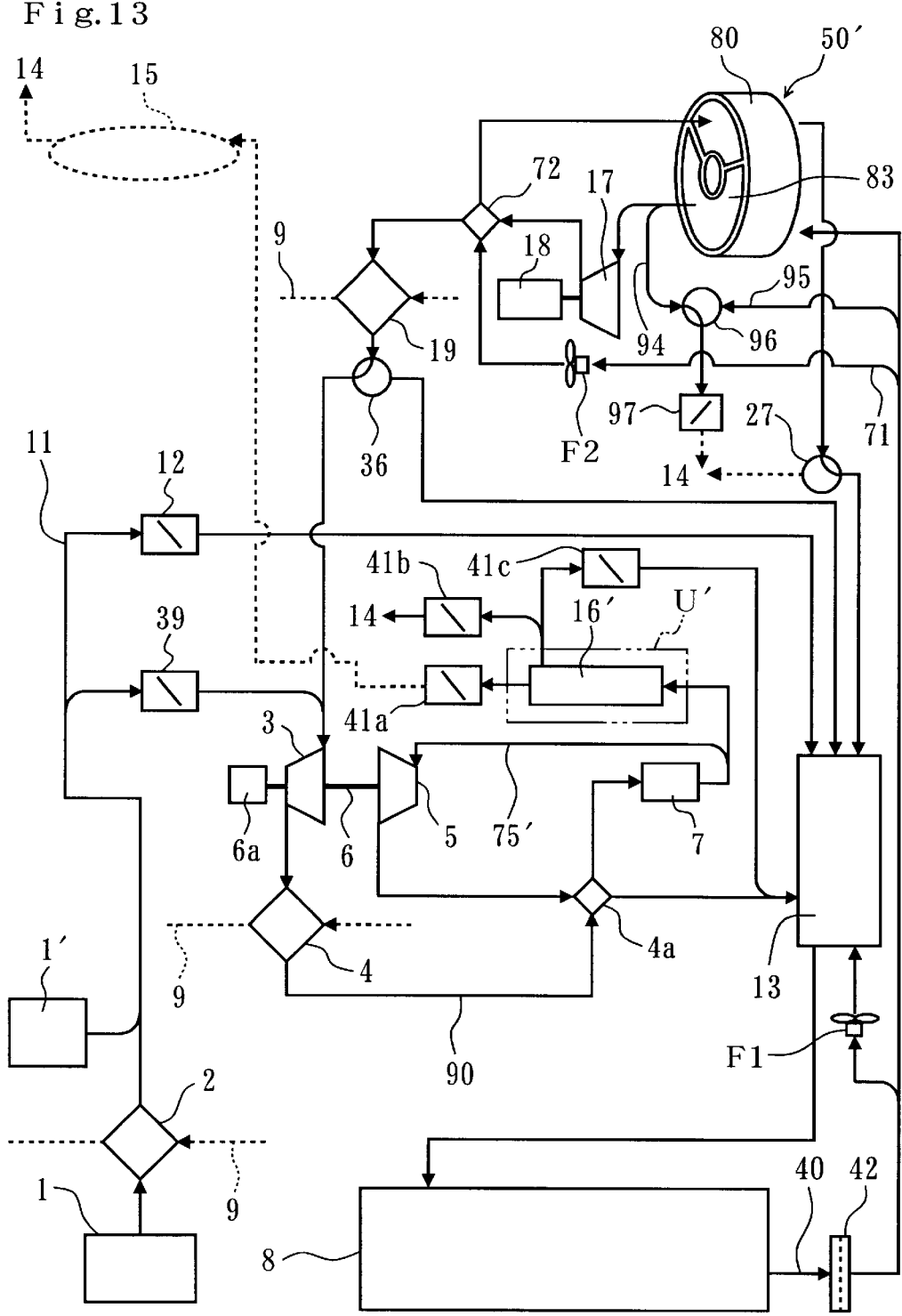
FIG. 13 is a layout diagram of an aircraft air conditioner according to a seventh embodiment of the present invention.
Figure 14:
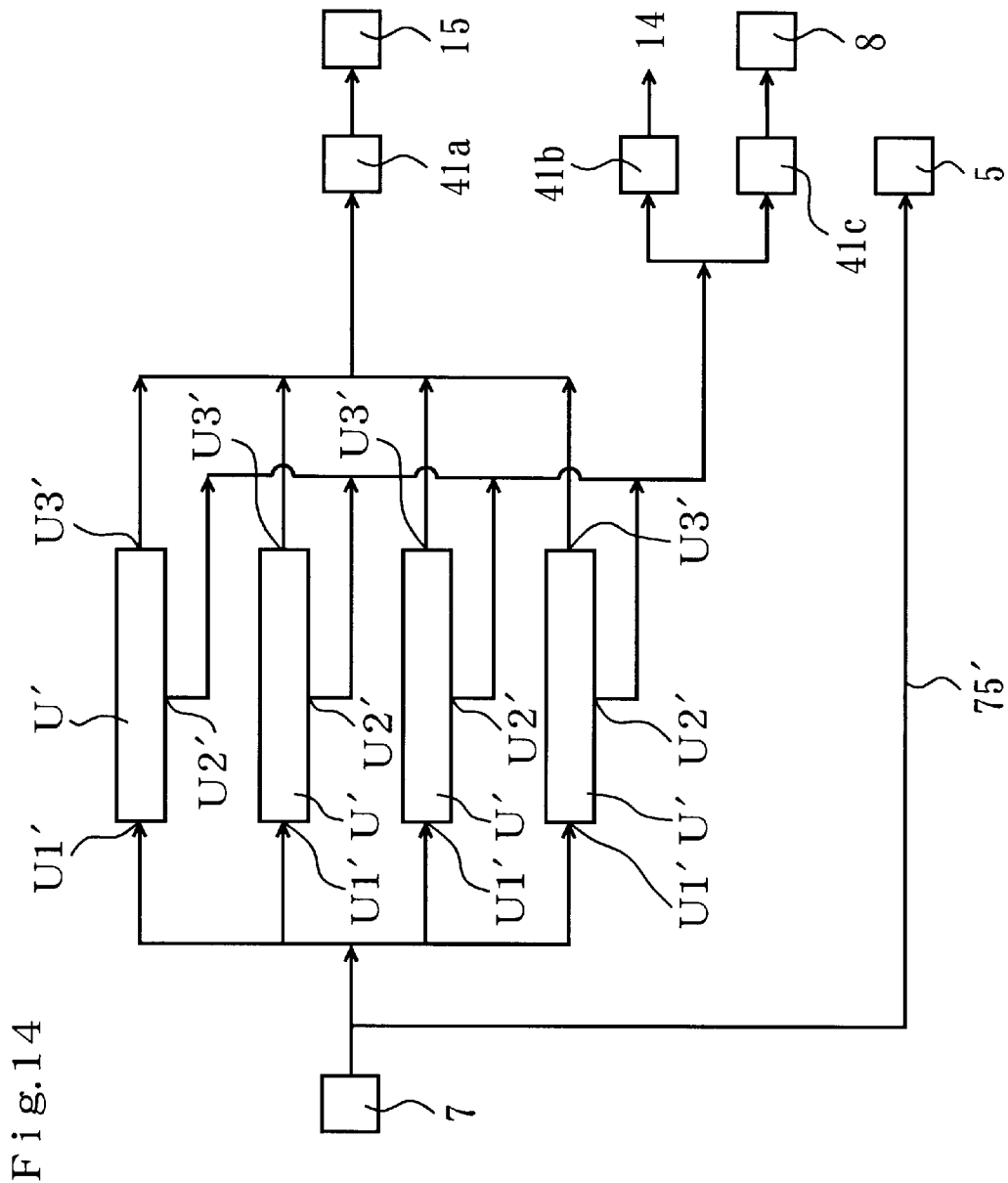
FIG. 14 is a diagram of the arrangement of the air separating unit in an aircraft air conditioner according to the seventh embodiment of the present invention.
Figure 15:
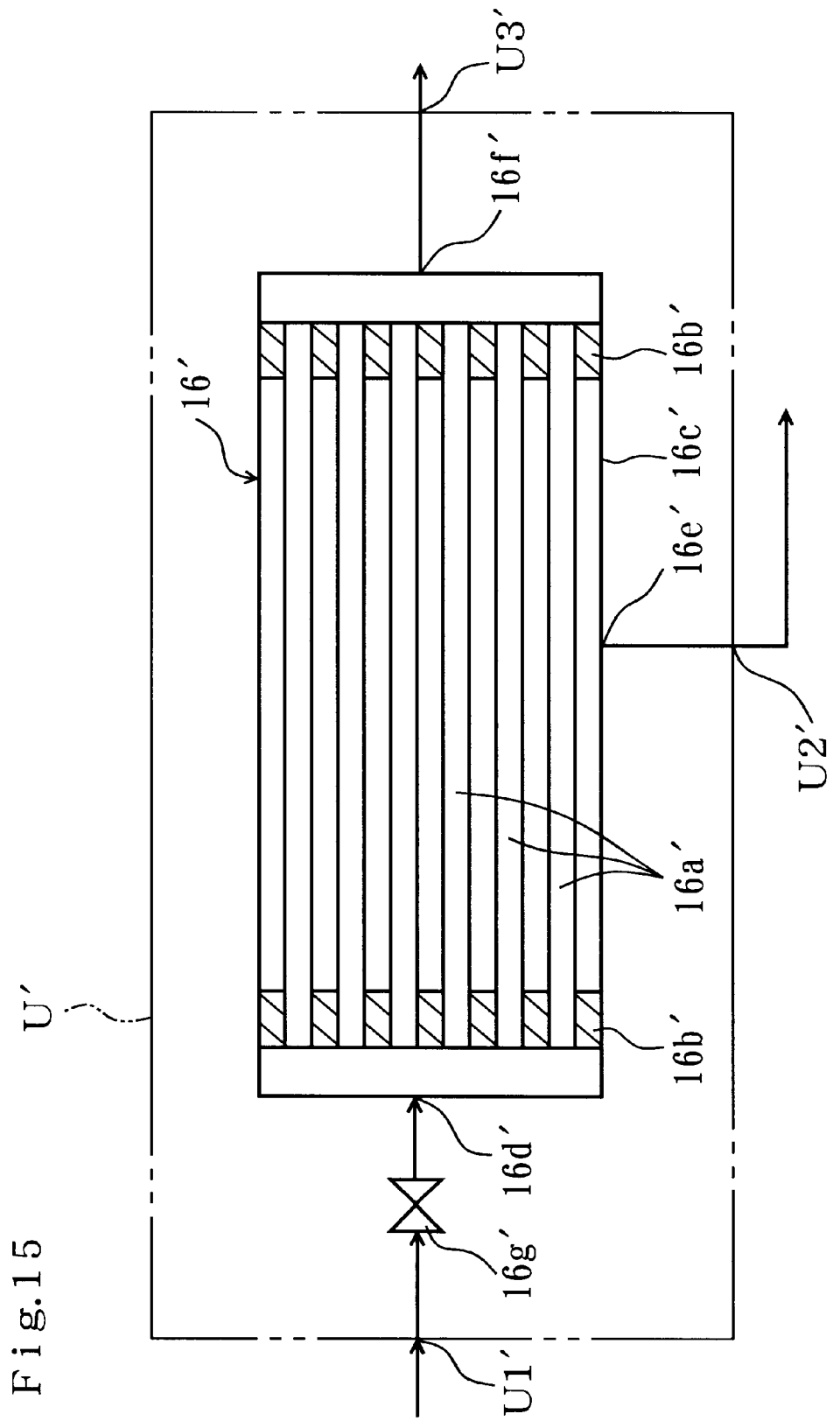
FIG. 15 is a layout diagram of the air separating unit in the aircraft air conditioner according to the seventh embodiment of the present invention.
Figure 16:
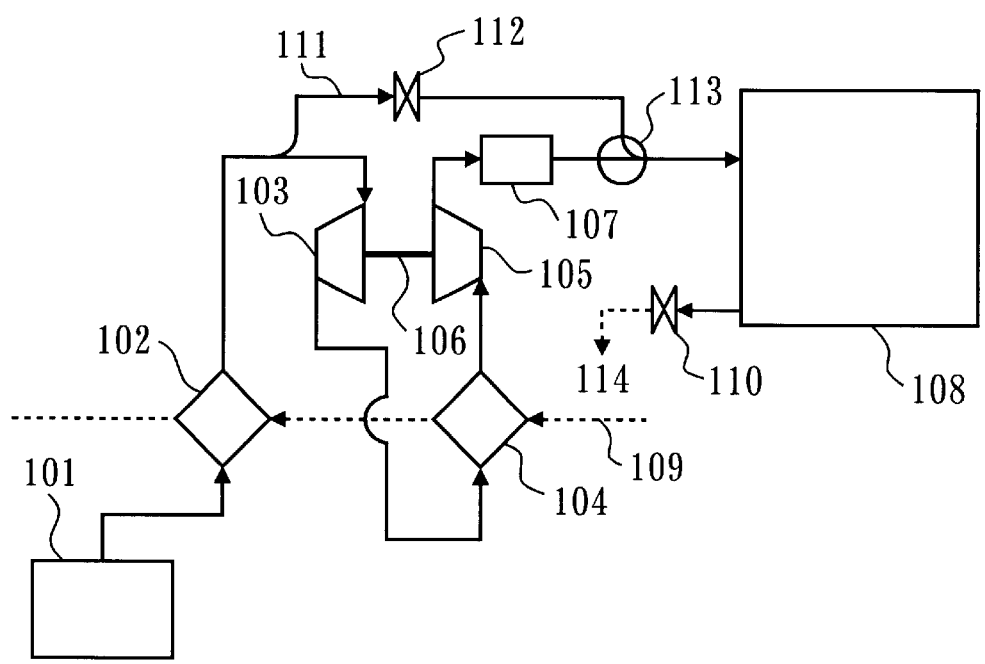
FIG. 16 is a layout diagram of a prior art aircraft air conditioner.

FIG. 13 to FIG. 15 illustrate an aircraft air conditioner according to a seventh embodiment of the present invention; portions which are the same as in the sixth embodiment are indicated by the same reference symbols and points of difference are described. In this seventh embodiment, a normally open air flow path 75' for feeding air from the compressor 3 to the expansion turbine 5 is provided. Some of the air flowing through this air flow path 75' is fed to the air separating sections 16', by which a plurality of air separation units U' mutually connected in parallel are constituted. Each of the separation units U' is connected with first to third control valves 41a, 41b and 41c. The degree of opening of each of the control valves 41a, 41b, 41c is adjusted by signals from the controller. The nitrogen-enriched gas and oxygen-concentrated air are discharged from the air separation units U'. After the nitrogen-enriched gas is fed to the fuel peripheral region 15 through the first control valve 41a, it is discharged to the space 14 outside the fuselage through a discharge path. The oxygen-concentrated air is made capable of being discharged to the space 14 outside the fuselage through the second control valve 41b and is made capable of being introduced into the cabin 8 through the third control valve 41c. The air flow rate passing through the air separation units U' is made capable of being adjusted by adjustment of the degree of opening of each of the control valves 41a, 41b, 41c. The air that is fed into the air flow path 75' is expanded practically adiabatically by the expansion turbine 5.

As shown in FIG. 14, the plurality of air separation units U' (four units in the case of this embodiment) have air inlets U1' that are mutually connected and also connected with the air flow path 75', nitrogen-enriched gas outlets U3' that are mutually connected and are connected with the fuel peripheral region 15 through the first control valve 41a and oxygen-concentrated air outlets U2' that are mutually connected. The oxygen-concentrated air discharge ports U2' are connected with space 14 outside the fuselage through the second control valve 41b and are connected with the cabin 8 through the third control valve 41c.

As shown in FIG. 15, the permeability for oxygen ($O_2$) in the air of the selectively permeable membrane 16a' constituting the air separating section 16' is higher than the permeability for nitrogen ($N_2$). In this way, air that has passed through the water separator 7 is separated into nitrogen-enriched gas and oxygen-concentrated air by the air separating section 16'. The selectively permeable membrane 16a' is comprised of a large number of hollow fibers. These hollow fibers are contained in a container 16c' and bundled by having both ends thereof embedded in a resin binder 16b', such as epoxy resin. The space between the inner circumference of container 16c' and the outer circumference of the two ends of the hollow fibers is sealed using the binder 16b'. One end aperture of the container 16c' is connected with one end aperture of each hollow fibers and the air inlet U1', and thus it functions as an air introduction port 16d' connected with the water separator 7. The other end aperture of the container 16c' is connected with the other end aperture of each hollow fibers and the nitrogen-enriched gas outlet U3', and thus it functions as a nitrogen-enriched gas discharge port 16f'. The nitrogen-enriched gas that is discharged from the nitrogen-enriched gas discharge port 16f' is introduced into the fuel peripheral region 15. The aperture formed between both ends of the container 16c' is connected with the outer circumference of the hollow fibers and the oxygen-concentrated air outlet U2', and thus it functions as an oxygen-concentrated air discharge port 16e'. The oxygen-concentrated air that is discharged from the oxygen-concentrated air discharge port 16e is made capable of being introduced into the cabin 8 without passing through the expansion turbine 5. That is, the oxygen-concentrated air that is reduced in pressure by passing through the selectively permeable membranes 16a' can be introduced into the cabin 8 without passing through the expansion turbine 5. In this way, the pressure difference between the outlet of the compressor 3 and the inlet of the expansion turbine 5 is reduced, so that drop in efficiency of the air cycle cooling device can be prevented. A valve 16g' is provided that opens and closes air introduction port 16d' in the air separating section 16'. Otherwise the constitution is the same as in the sixth embodiment and identical portions are indicated by the same reference symbols.

The present invention is not restricted to the embodiments described above.

For example, the number of the adsorption sections in the first, second, third, and fifth embodiments described above can be three or more and the number of changeover valves can be increased corresponding to the increase in the number of the adsorption sections. For example, if the number of the adsorption sections is three or more, any one or a plurality of adsorption sections can be connected to the outflow air flow path while the remaining adsorption sections are connected to the bypass air flow path, wherein the adsorption sections that are connected to the outflow air flow path and the adsorption sections that are connected to the bypass air flow path are changed over with a pre-set sequence at set time intervals.

In the embodiments, the adsorption agent 23b, 24b constituting the adsorption sections 23, 24, 83 is not restricted to silica gel or zeolite, and other adsorption agents which have adsorption capability for other substances contained in the air can be employed.

A multi-stage expansion turbine can be employed in the embodiments.

The controller 25 in the embodiments can be arranged to output changeover operating signals based on signals from temperature sensors, moisture sensors, or oxygen sensors etc. provided in piping connected to the interior of the adsorption sections 23, 24, 83 and/or their input/output ports.

In the embodiments, by signals from the controller in accordance with the condition of the aircraft, the degree of opening of the valves is adjusted and the changeover valves are changed over in order to alter the condition of the air conditioner. Instead of this, it is possible to provide temperature sensors and/or flow rate sensors in the air flow paths and/or coolant flow paths of the air conditioner for adjusting the degree of opening of the valves and/or changing over the changeover valves in accordance with signals from these sensors.

In the first, second, third and fifth embodiments, the extracted air from the engine 1 can pass through the adsorption agent 23b, 24b prior to introduction into the pre-cooler 2. In this case, adsorption agent 23b, 24b can be regenerated by supply of a small quantity of the air since the temperature of the air is high.

In the embodiments, the air passing through the adsorption sections 23, 24, 83 is cooled prior to mixing with the air flowing through the main air flow path 90, but it is possible to cool the air after this mixing.

In the embodiments, the air flowing through the main air flow path 90 is mixed with the air flowing through the adsorption sections 23, 24, 83 prior to compression by the compressor 3, instead of this, it is possible to mix the air flowing through the main air flow path 90 with the air flowing through the adsorption sections 23, 24, 83 after compression by the compressor 3, and then to cool this mixed air by the main cooler 4.

In the vapor cycle heat exchanger unit 30 in the first, second, third and fifth embodiments, it is possible to be changed over to a cabin heating mode in which air is heated by heat taken from outside the fuselage depending on conditions.

Also, in the fourth and fifth embodiments, instead of heating the air flowing through the circulating air flow path 92 by means of the heat exchanger 35a, or in addition to heating the air by means of the heat exchanger 35a, it is possible to heat the air by heat generated from the electrical equipment mounted in the aircraft.

What is claimed is:

1. An aircraft air conditioner in which air extracted from an engine that is fed through a main air flow path into an aircraft cabin is cooled by a cooling device, comprising:

an outflow air flow path for outflow of air in the cabin;

an auxiliary air flow path for feeding air into the cabin;

a plurality of adsorption sections respectively constituted by an adsorption agent that adsorbs molecules contained in the air and that releases the adsorbed molecules by being raised in temperature to more than the temperature thereof on adsorption;

an air flow path changeover mechanism; and a controller that controls the air flow path changeover mechanism, wherein each of the adsorption sections is adapted to being changed over between a condition in which it is connected to an auxiliary air flow path in which air of higher temperature than the air within the cabin flows and a condition in which it is connected to the outflow air flow path by means of the air flow path changeover mechanism, each of the adsorption sections is changed over between the condition connected to the auxiliary air flow path and the condition connected to the outflow air flow path by controlling the air flow path changeover mechanism by the controller, and an air flow path of the air conditioner is adapted to feed the air flowing out from said cabin through said outflow air flow path to the cabin again after passing through said adsorption sections.

2. The aircraft air conditioner according to claim 1, wherein, when at least one of said adsorption sections is connected to said auxiliary air flow path, at least one other of said adsorption sections is connected to the outflow air flow path.

3. The aircraft air conditioner according to claim 1 or 2, wherein said adsorption sections are constituted of at least either an adsorption agent capable of adsorbing water molecules or an adsorption agent capable of adsorbing oxygen molecules.

4. The aircraft air conditioner according to claim 1 or 2, wherein said adsorption sections are constituted of an adsorption agent capable of adsorbing at least oxygen molecules, and air of oxygen concentration lowered in the adsorption sections is fed into a fuel peripheral region.

5. The aircraft air conditioner according to claim 1 or 2, wherein the flow rate of air flowing through the auxiliary air flow path is made adjustable.

6. The aircraft air conditioner according to claim 1 or 2, comprising a selectively permeable membrane arranged at a position through which air flowing in an air flow path of the air conditioner passes, so that it separates the air into nitrogen-enriched gas and oxygen-concentrated air, wherein the nitrogen-enriched gas can be fed into a fuel peripheral region of the aircraft, and the oxygen-concentrated air can be fed into the cabin.

7. The aircraft air conditioner according to claim 6, wherein said adsorption agent is made capable of adsorbing at least water molecules, and said selectively permeable membrane is provided in an air flow path in which air flowing out from said cabin through said outflow air flow path flows after passing through said adsorption sections.

8. The aircraft air conditioner according to claim 6, wherein said adsorption agent is made capable of adsorbing at least water molecules, and arrangement is made such that air flowing out from said cabin through said outflow air flow path can be fed into said cabin after passing through said adsorption sections.

9. The aircraft air conditioner according to claim 8, wherein the air flow path is made capable of being changed over between a condition in which the air flowing through said auxiliary air flow path is discharged outside the fuselage and a condition in which it is fed to the cabin, after passing through said adsorption sections; and the air flow path is made capable of being changed over between a condition in which the air flowing out from said cabin through said outflow air flow path is fed to the cabin and a condition in which it is fed to said cooling device, after passing through said adsorption sections.

10. The aircraft air conditioner according to claim 1 or 2, wherein said auxiliary air flow path is constituted by a bypass air flow path for feeding air extracted from said engine to the cabin without passing through said cooling device.

11. The aircraft air conditioner according to claim 1 or 2, wherein said auxiliary air flow path is constituted by a circulating air flow path for feeding air flowing out from the cabin again into the cabin, and means for heating air flowing through the circulating air flow path before passing through said adsorption agent is provided with.

12. The aircraft air conditioner according to claim 1, wherein said auxiliary air flow path is constituted by a circulating air flow path for feeding air flowing out from the cabin again into the cabin;

said adsorption agent is made capable of adsorbing at least water molecules;

compression means is provided for compressing air flowing out from said cabin through said outflow air flow path downstream of said adsorption sections;

a heat exchanger is provided downstream of said compression means, for performing heat exchange between the compressed air and the air flowing through said circulating air flow path; and the air flowing through the circulating air flow path is heated in the heat exchanger prior to passage through said adsorption agent.

13. The aircraft air conditioner according to claim 12, wherein a selectively permeable membrane is provided for separating the air cooled in said heat exchanger into nitrogen-enriched gas and oxygen-concentrated air; and arrangement is made such that the nitrogen-enriched gas can be fed into a fuel peripheral region of the aircraft and the oxygen-concentrated air can be fed into the cabin.

14. The aircraft air conditioner according to claim 1, comprising a discharge mechanism capable of discharging at least some of the air flowing through said outflow air flow path to the space outside the fuselage after passing through said adsorption section.

15. The aircraft air conditioner according to claim 14, comprising a discharge changeover mechanism by which at least some of the air flowing through said outflow air flow path is changed over between a condition in which it is discharged to the space outside the fuselage via said discharge mechanism after passing through said adsorption section and a condition in which it is discharged to the space outside the fuselage via said discharge mechanism without passing through said adsorption section.

* * * * *